US011728968B2

(12) United States Patent
Inoue et al.

(10) Patent No.: US 11,728,968 B2
(45) Date of Patent: Aug. 15, 2023

(54) AUTHENTICATED ENCRYPTION DEVICE, AUTHENTICATED DECRYPTION DEVICE, AUTHENTICATED ENCRYPTION METHOD, AUTHENTICATED DECRYPTION METHOD, AUTHENTICATED ENCRYPTION PROGRAM, AND AUTHENTICATED DECRYPTION PROGRAM

(71) Applicant: NEC Corporation, Tokyo (JP)

(72) Inventors: Akiko Inoue, Tokyo (JP); Kazuhiko Minematsu, Tokyo (JP)

(73) Assignee: NRC CORPORATION, Tokyo (JP)

( * ) Notice: Subject to any disclaimer, the term of this patent is extended or adjusted under 35 U.S.C. 154(b) by 175 days.

(21) Appl. No.: 17/289,484

(22) PCT Filed: Nov. 7, 2018

(86) PCT No.: PCT/JP2018/041338
§ 371 (c)(1),
(2) Date: Apr. 28, 2021

(87) PCT Pub. No.: WO2020/095382
PCT Pub. Date: May 14, 2020

(65) Prior Publication Data
US 2021/0399875 A1    Dec. 23, 2021

(51) Int. Cl.
*H04L 29/06* (2006.01)
*G06F 21/00* (2013.01)
(Continued)

(52) U.S. Cl.
CPC .......... *H04L 9/0618* (2013.01); *H04L 9/3234* (2013.01)

(58) Field of Classification Search
None
See application file for complete search history.

(56) References Cited

U.S. PATENT DOCUMENTS

| 7,046,802 B2 | 5/2006 | Rogaway |
| 7,200,227 B2 | 4/2007 | Rogaway |

(Continued)

FOREIGN PATENT DOCUMENTS

| JP | 6386198 B1 | 9/2018 |
| WO | 2015/015702 A1 | 2/2015 |

OTHER PUBLICATIONS

International Search Report for PCT Application No. PCT/JP2018/041338, dated Feb. 12, 2019.

(Continued)

*Primary Examiner* — Lisa C Lewis
(74) *Attorney, Agent, or Firm* — Sughrue Mion, PLLC

(57) ABSTRACT

An authenticated encryption device 10 includes: an encryption means 11 which encrypts a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector not overlapping a past value and a secret key, being added; and a computation means 12 which computes, as a checksum, the exclusive OR of corresponding bits of a first bit string, a bit number of which is less than the predetermined bit number, of each of a plurality of plaintext blocks constituting the plaintext.

20 Claims, 8 Drawing Sheets

(51) Int. Cl.
*H04L 9/06* (2006.01)
*H04L 9/32* (2006.01)

(56) References Cited

U.S. PATENT DOCUMENTS

| | | | |
|---|---|---|---|
| 7,949,129 B2 | 5/2011 | Rogaway | |
| 8,321,675 B2 | 11/2012 | Rogaway | |
| 2006/0285684 A1* | 12/2006 | Rogaway | H04L 9/0637 380/37 |
| 2016/0173276 A1 | 6/2016 | Minematsu | |
| 2019/0363891 A1 | 11/2019 | Naito | |

OTHER PUBLICATIONS

English translation of Written opinion for PCT Application No. PCT/JP2018/041338, dated Feb. 12, 2019.
Morris Dworkin, "Recommendation for Block Cipher Modes of Operation: The CCM Mode for Authentication and Confidentiality", NIST Special Publication 800-38C, May 2004, pp. 1-21.
Morris Dworkin, "Recommendation for Block Cipher Modes of Operation: Galois/Counter Mode (GCM) and GMAC", NIST Special Publication 800-38D, Nov. 2007, pp. 1-31.
M. Liskov et al., "Tweakable Block Ciphers," Advances in Cryptology—CRYPTO 2002, 22nd Annual International Cryptology Conference, Santa Barbara, California, USA, Aug. 18-22, 2002, Proceedings. Lecture Notes in Computer Science 2442 Springer 2002, pp. 31-46.
Phillip Rogaway, "Efficient Instantiations of Tweakable Blockciphers and Refinements to Modes OCB and PMAC," Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31.
Cogliati et al., "Tweaking Even-Mansour Ciphers", Advances in Cryptology—CRYPTO 2015, 35th Annual Cryptology Conference, Santa Barbara, CA, USA, Aug. 16-20, 2015, Proceedings, Part I, Lecture Notes in Computer Science, vol. 9215, pp. 189-208, Springer, Heidelberg (2015).
Robert Granger et al., "Improved Masking for Tweakabie Blockciphers with Applications to Authenticated Encryption", Advances in Cryptology—EUROCRYPT 2016, 35th Annual International Conference on the Theory and Applications of Cryptographic Techniques, Vienna, Austria, May 8-12, 2016, Proceedings, Part I, Lecture Notes in Computer Science, vol. 9665, pp. 263-293, Springer, Heidelberg (2016).

* cited by examiner

AUTHENTICATED ENCRYPTION DEVICE, AUTHENTICATED DECRYPTION DEVICE, AUTHENTICATED ENCRYPTION METHOD, AUTHENTICATED DECRYPTION METHOD, AUTHENTICATED ENCRYPTION PROGRAM, AND AUTHENTICATED DECRYPTION PROGRAM

This application is a National Stage Entry of PCT/JP2018/041338 filed on Nov. 7, 2018, the contents of all of which are incorporated herein by reference, in their entirety.

TECHNICAL FIELD

The present invention relates to an authenticated encryption device, an authenticated decryption device, an authenticated encryption method, an authenticated decryption method, an authenticated encryption program, and an authenticated decryption program, and in particular, an authenticated encryption device, an authenticated decryption device, an authenticated encryption method, an authenticated decryption method, an authenticated encryption program, and an authenticated decryption program to which an authenticated encryption scheme using symmetric-key cryptography has been applied.

BACKGROUND ART

Authenticated encryption (AE) is a technique for simultaneously encrypting a plaintext message (hereinafter simply referred to as plaintext) and computing an authentication tag (hereinafter also simply referred to as a tag) to be used to detect falsification, by using a secret key that has been shared in advance.

When AE is applied to communication content that passes through a communication line, both concealing of the content from wiretapping and detection of unauthorized falsification are achieved. Stated another way, the communication content is protected more strongly.

An example of a basic input/output in AE is described below. In this example, as two persons that share a secret key K, consider Alice and Bob. Furthermore, it is assumed that an encryption function of AE is AEnc, and a decryption function of AE is ADec. It is also assumed that plaintext to be encrypted is M. Furthermore, a variable N called an initial vector is introduced.

First, a case where Alice communicates a message that has been encrypted in AE to Bob is described. First, Alice generates a variable N, and then performs computation in such a way that (C, T)=AEnc_K(N, M). AEnc_K is a function in which the secret key K is a parameter. Furthermore, C is ciphertext. Furthermore, T is a fixed-length variable that is called a tag and is used to detect falsification. Alice transmits (N, C, T) that has been generated to Bob.

Bob receives the information (N', C', T'). Next, Bob computes ADec_K(N', C', T') as decryption processing. If falsification has been performed in the middle of communication and (N', C', T')≠(N, C, T) is established, ADec_K (N', C', T') serves as an error message indicating that falsification has been performed.

If falsification has not been performed in the middle of communication and (N', C', T')=(N, C, T) is established, ADec_K(N', C', T')=M is established. Stated another way, encrypted plaintext M is correctly decrypted. Examples of the authenticated encryption scheme described above include CCM described in Non Patent Literature (NPL) 1 and GCM described in NPL 2.

Furthermore, one example of AE is achieved by combining parts having a specified input/output length. Specifically, when data having a specified bit length is input, a part to be combined outputs data having the same bit length as a bit length of the input data.

Hereinafter, the part described above is referred to as a primitive in authenticated encryption. Furthermore, it is assumed that an input/output length relating to the primitive is n bits. Examples of the primitive include a block cipher, non-keyed cryptographic replacement, and a tweakable block cipher.

For example, in a block cipher, a k-bit secret key K and n-bit plaintext M are received as an input, and n-bit ciphertext C is output. Processing using the block cipher is expressed in such a way that E(K, M)=C.

Furthermore, in non-keyed cryptographic replacement, n-bit plaintext M is received as an input, and n-bit ciphertext C is output. Processing in non-keyed cryptographic replacement is expressed in such a way that P(M)=C.

Furthermore, in a tweakable block cipher, a k-bit secret key K, a tw-bit tweak Tw, and n-bit plaintext M are received as an input, and n-bit ciphertext C is output. Processing using the tweakable block cipher is expressed in such a way that TE(K, Tw, M)=C.

The tweakable block cipher described above is also achieved by a block cipher E or non-keyed cryptographic replacement P. For example, when the scheme described in NPL 3 is employed, a keyed function H that includes a key L that is different from a secret key K of a block cipher E and has an input/output length of n bits is also used, and processing using a tweakable block cipher is expressed by the formula described below.

$$LRW(K, Tw, M) = E(K, H(L, Tw) + M) + H(L, Tw) \quad \text{Formula (1)}$$

Note that "+" in Formula (1) indicates a bitwise exclusive OR (XOR). Hereinafter, unless otherwise specified, "+" in the formulae herein indicates a bitwise XOR.

According to the scheme described in NPL 3, in a case where the keyed function H is an AXU universal hash function, the processing expressed by Formula (1) achieves a secure tweakable block cipher. Stated another way, in a case where, with respect to a secret key L selected at random and two arbitrary inputs X and X' different from each other, the probability Pr[H(L, X)+H(L, X')=c] is smaller than any c of n bits, the processing expressed by Formula (1) achieves a secure tweakable block cipher.

Furthermore, when the XEX* mode described in NPL 4 is employed, a key in the entire encryption processing is only a single key of a block cipher. Note that the XEX* mode is a generic name for the XEX mode and the XE mode of a tweakable block cipher. Processing using a tweakable block cipher of the XEX* mode is expressed by the formulae described below, when Tweak Tw=(i, N).

$$XEX(K, Tw, M) = \quad \text{Formula (2)}$$
$$E(K, mult(2^i, E(K, N)) + M) + mult(2^i, E(K, N))$$
$$XE(K, Tw, M) = E(K, mult(2^i, E(K, N)) + M) \quad \text{Formula (3)}$$

Note that mult(·, ·) in Formulae (2) and (3) indicates the multiplication of two elements on the Galois field $GF(2^n)$.

Furthermore, $2^n$ in Formulae (2) and (3) indicates 2 raised to the i-th power on the Galois field $GF(2^n)$.

Furthermore, when the TEM mode described in NPL 5 is employed, non-keyed cryptographic replacement P and a keyed function H that includes a secret key K and has an input/output length of n bits are used, and processing using a tweakable block cipher is expressed by the formula described below.

$$TEM(K, Tw, M) = P(H(K, Tw) + M) + H(K, Tw) \quad \text{Formula (4)}$$

According to the scheme described in NPL 5, in a case where the keyed function H is an AXU universal hash function and the keyed function H is uniform, the processing expressed by Formula (4) achieves a secure tweakable block cipher.

Note that in a case where the keyed function H is an AXU universal hash function, the keyed function H satisfies a condition in which the probability $Pr[H(K, X)+H(K, X')=c]$ is smaller than any c of n bits, with respect to a secret key K selected at random and two arbitrary inputs X and X' different from each other.

Furthermore, in a case where the keyed function H is uniform, the keyed function H satisfies a condition in which the probability $Pr[H(K, X)=Y]$ is sufficiently small, with respect to a secret K selected at random, an arbitrary input X, and an arbitrary output Y.

An example of a method for achieving AE is universal composition. Universal composition is a method for combining a secure scheme serving as an encryption scheme and a secure scheme serving as a falsification detection method. An example of universal composition is GCM obtained by combining the CTR mode, which is an encryption scheme and GHASH, which is a falsification detection method.

Furthermore, a scheme in which the number of times of use of a primitive per one block of plaintext is asymptotically 2, including a scheme generated due to universal composition, is referred to as a rate 1/2 scheme. Examples of the rate 1/2 scheme include GCM and CCM described above.

Furthermore, a scheme in which the number of times of use of a primitive per one block of plaintext is asymptotically 1 is referred to as a rate 1 scheme. Examples of the rate 1 scheme include OCB serving as the authenticated encryption scheme described in PTL 1 to PTL 4 and OTR serving as the authenticated encryption scheme described in PTL 5.

OCB is an authenticated encryption scheme of rate 1 that uses a tweakable block cipher of the XEX* mode. The tweakable block cipher of the XEX* mode includes a tweakable block cipher of the XEX mode and a tweakable block cipher of the XE mode. In OCB, processing using the tweakable block cipher of the XEX* mode uses a block cipher E, and is expressed by the formulae described below.

$$XEX(K, Tw, M) = E(K, \Delta(K, Tw) + M) + \Delta(K, Tw) \quad \text{Formula (5)}$$

$$XE(K, Tw, M) = E(K, \Delta(K, Tw) + M) \quad \text{Formula (6)}$$

Note that the mask value $\Delta(K, Tw)$ in Formulae (5) and (6) is a value that is uniquely determined by a tweak Tw and a secret key K. For example, as described above, the mask value may be computed by using multiplication on a Galois field. In OCB, the tweakable block cipher of the XEX* mode is used similarly to the ECB mode, and therefore plaintext is encrypted.

Next, a falsification detection method in OCB is described. First, in OCB, plaintext is sectioned every n bits. Next, in OCB, a bitwise exclusive OR of sectioned pieces of n-bit plaintext is computed. An n-bit value obtained by computing a bitwise exclusive OR is called a checksum.

Specifically, in a case where plaintext M includes m n-bit plaintext blocks M[1], M[2], . . . , and M[m], a checksum SUM is computed as described below.

$$SUM = M[1] + M[2] + \ldots + M[m] \quad \text{Formula (7)}$$

Next, in OCB, the obtained checksum is encrypted using a tweakable block cipher of the XE mode. The encrypted checksum serves as a tag.

Furthermore, OTR is an authenticated encryption scheme of rate 1 that uses a tweakable block cipher of the XE mode. Similarly to OCB, in OTR, as a falsification detection method, a checksum is computed, and the computed checksum is encrypted, and therefore a tag is generated.

However, in OTR, a checksum is not obtained by computing a bitwise exclusive OR of all of the plaintext blocks, but the checksum is obtained by computing a bitwise exclusive OR of only even-numbered plaintext blocks.

Specifically, in a case where plaintext M includes m n-bit plaintext blocks M[1], M[2], . . . , and M[m] and m is an even number, a checksum SUM is computed as described below.

$$SUM = M[2] + M[4] + \ldots + M[m-2] + M[m] \quad \text{Formula (8)}$$

Furthermore, an example of an authenticated encryption scheme of rate 1 that is different from OCB and OTR includes OPP using the TEM mode that is described in NPL 6.

CITATION LIST

Patent Literature

PTL 1: U.S. Pat. No. 7,046,802
PTL 2: U.S. Pat. No. 7,200,227
PTL 3: U.S. Pat. No. 7,949,129
PTL 4: U.S. Pat. No. 8,321,675
PTL 5: U.S. Patent Application Laid-Open No. 2016/0173276

Non Patent Literature

NPL 1: NIST Special Publication 800-38C Recommendation for Block Cipher Modes of Operation: The CCM Mode for Authentication and Confidentiality
NPL 2: NIST Special Publication 800-38D Recommendation for Block Cipher Modes of Operation: Galois/Counter Mode (GCM) and GMAC
NPL 3: M. Liskov, R. L. Rivest, D. Wagner, "Tweakable Block Ciphers," Advances in Cryptology—CRYPTO 2002, 22nd Annual International Cryptology Conference, Santa Barbara, Calif., USA, Aug. 18-22, 2002, Proceedings. Lecture Notes in Computer Science 2442 Springer 2002, pp. 31-46.

NPL 4: Phillip Rogaway, "Efficient Instantiations of Tweakable Blockciphers and Refinements to Modes OCB and PMAC," Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31.

NPL 5: Cogliati, B., Lampe, R., Seurin, Y, "Tweaking Even-Mansour ciphers. In: Gennaro, R., Robshaw, M. J. B. (eds.)," CRYPTO 2015, Part I. LNCS, vol. 9215, pp. 189-208. Springer, Heidelberg (2015).

NPL 6: Granger, Robert and Jovanovic, Philipp and Mennink, Bart and Neves, Samuel, "Improved Masking for Tweakable Blockciphers with Applications to Authenticated Encryption," LNCS, vol. 9665, pp. 263-293, 2016.

SUMMARY OF INVENTION

Technical Problem

An authenticated encryption scheme in which an n-bit checksum is computed, as is represented by OCB, OTR, and the like, has a problem of an increase in state size. The state size means a memory size required to be held in each processing unit. The state size is one example of an evaluation criterion of an encryption scheme.

For example, in the case of OCB, one-block encryption is considered to be a processing unit. One-block encryption in OCB is expressed by the formula described below.

$$C[i] = E(K, \Delta(K, Tw) + M[i]) + \Delta(K, Tw) \quad \text{Formula (9)}$$

Note that K in Formula (9) is a secret key of a block cipher E. Furthermore, M[i] is an i-th plaintext block. Furthermore, C[i] is an i-th ciphertext block. Furthermore, Tw is a tweak. Furthermore, the mask value $\Delta(K, Tw)$ is a value that is uniquely determined by a tweak Tw and a secret key K.

In a case where one-block encryption is a processing unit, a state size in OCB is 3n bits. The breakdown of 3n bits is n bits for a memory for encrypting one plaintext block, n bits for a memory that holds the mask value $\Delta(K, Tw)$, and n bits for a memory that holds a value of a computed checksum.

Note that a reason for holding a mask value and a value of a checksum is that, in processing on an (i+1)th plaintext block, a mask value and a value of a checksum that have been used in processing on an i-th plaintext block are required.

In a case where an encryption scheme is implemented in hardware that has restrictions on computation resources, such as a wireless sensor or a radio frequency identifier (RFID) tag, an allowable state size is in proportion to a circuit scale. Therefore, in implementation of an encryption scheme, and in particular, in implementation of an encryption scheme in hardware, a state size is a significant evaluation criterion.

However, there is a characteristic in which a state size in an authenticated encryption scheme in which a checksum is computed is greater than a state size in an encryption scheme in which only encryption processing or decryption processing is performed by n bits that are the bit number of the checksum.

In the case of OCB described above, a state size required to compute a checksum occupies ⅓ of the entire state size. However, as a state size increases, an encryption scheme has higher security. Therefore, a person who implements an authenticated encryption scheme fails to reduce a state size without careful consideration.

As described above, a relationship between a state size and the security of encryption normally corresponds to a trade-off relationship. Stated another way, when a state size is reduced without careful consideration, asymptotic security decreases. Note that asymptotic security corresponds to a value of a security order obtained at the time of divergence of n to infinity.

OBJECT OF INVENTION

Accordingly, the present invention has been made to solve the problems described above, and it is an object of the present invention to provide an authenticated encryption device, an authenticated decryption device, an authenticated encryption method, an authenticated decryption method, an authenticated encryption program, and an authenticated decryption program that are capable of reducing a state size that increases due to computation of a checksum, without reducing asymptotic security.

Solution to Problem

An authenticated encryption device according to the present invention includes: an encryption means which encrypts a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector not overlapping a past value and a secret key, being added; and a computation means which computes, as a checksum, the exclusive OR of corresponding bits of a first bit string, a bit number of which is less than the predetermined bit number, of each of a plurality of plaintext blocks constituting the plaintext.

An authenticated decryption device according to the present invention includes: a decryption means which decrypts a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and a computation means which computes, as a checksum, the exclusive OR of corresponding bits of a first bit string, a bit number of which is less than the predetermined bit number, of each of a plurality of plaintext blocks constituting a plaintext obtained by decrypting the ciphertext.

An authenticated encryption method according to the present invention includes: encrypting a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector not overlapping a past value and a secret key, being added; and computing, as a checksum, the exclusive OR of corresponding bits of a first bit string, a bit number of which is less than the predetermined bit number, of each of a plurality of plaintext blocks constituting the plaintext.

An authenticated decryption method according to the present invention includes: decrypting a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and computing, as a checksum, the exclusive OR of corresponding bits of a first bit string, a bit number of which is less than the predetermined bit number, of each of a plurality of plaintext blocks constituting a plaintext obtained by decrypting the ciphertext.

An authenticated encryption program according to the present invention causes a computer to perform: encryption processing for encrypting a plaintext block by inputting, to an encryption function whereby data of a predetermined bit number is output when data of the predetermined bit number is input, a plaintext block of the predetermined bit number constituting the plaintext to be encrypted with a mask value which is uniquely determined from an adjustment value including an initial vector not overlapping a past value and a secret key, being added; and computation processing for computing, as a checksum, the exclusive OR of corresponding bits of a first bit string, a bit number of which is less than the predetermined bit number, of each of a plurality of plaintext blocks constituting the plaintext.

An authenticated decryption program according to the present invention causes a computer to perform: decryption processing for decrypting a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and computation processing for computing, as a checksum, the exclusive OR of corresponding bits of a first bit string, a bit number of which is less than the predetermined bit number, of each of a plurality of plaintext blocks constituting a plaintext obtained by decrypting the ciphertext.

Advantageous Effects of Invention

According to the present invention, a state size that increases due to computation of a checksum can be reduced without reducing asymptotic security.

DESCRIPTION OF EMBODIMENTS

Exemplary Embodiment 1

[Description of Configuration]

Figure 1:
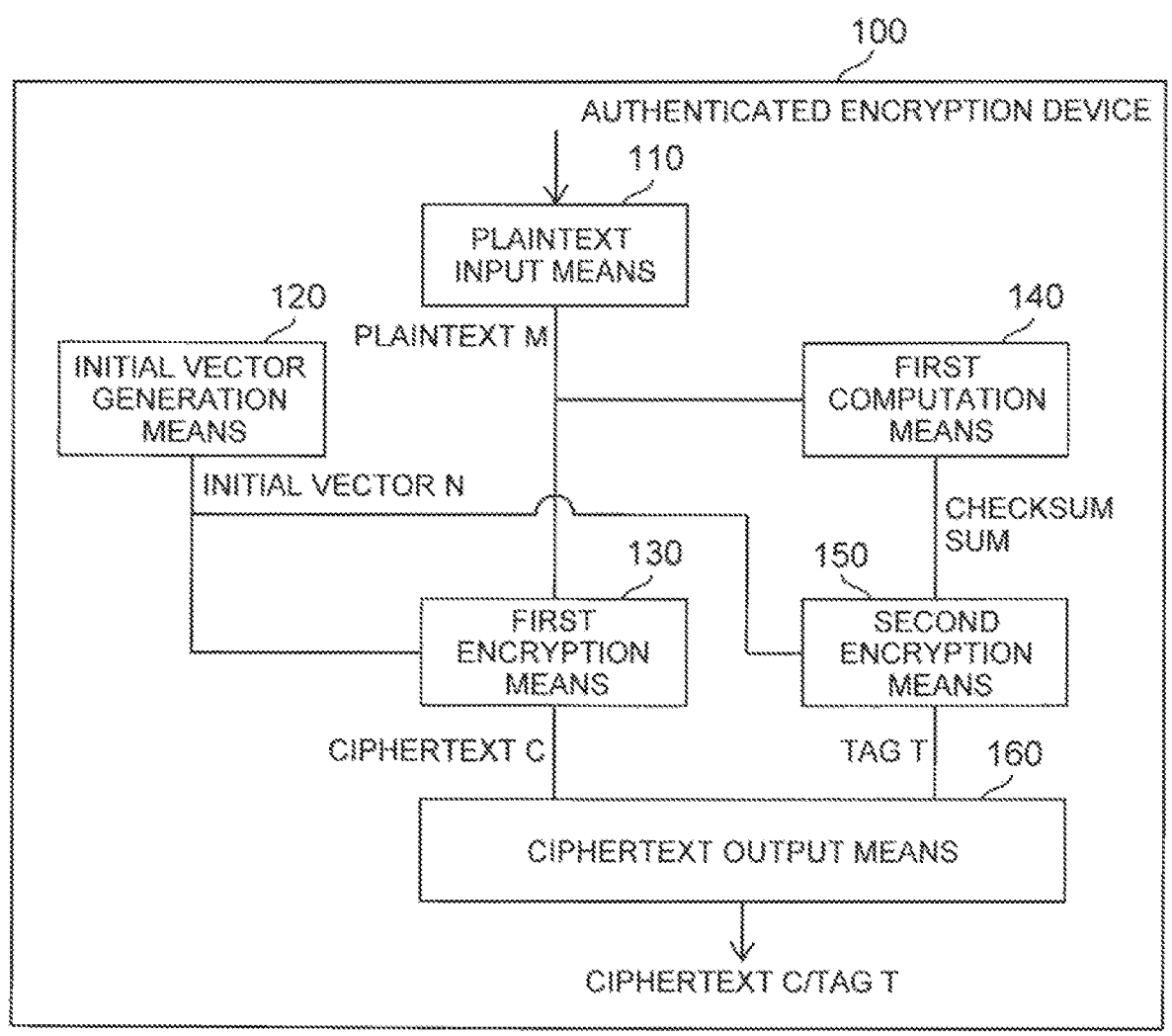
FIG. 1 is a block diagram showing a configuration example of an authenticated encryption device according to a first exemplary embodiment of the present invention.

Exemplary embodiments of the present invention are described below with reference to the drawings. FIG. 1 is a block diagram showing a configuration example of an authenticated encryption device according to a first exemplary embodiment of the present invention.

As described above, in a case where a checksum having the same bit length as a bit length relating to a primitive to be used in a tweakable block cipher is computed in an authenticated encryption scheme, there is a problem of an increase in state size.

When it is assumed that a bit length relating to a primitive to be used is n, an authenticated encryption device 100 according to the present exemplary embodiment computes an s-bit checksum, where s<n, in order to solve the problem described above.

A relationship between a state size and the security of encryption normally corresponds to a trade-off relationship. Stated another way, when the state size is reduced, the security of encryption decreases. However, in the present exemplary embodiment, when $n/2<=s<n$, asymptotic security does not change from asymptotic security at a time when s=n. A specific configuration and an operation of the authenticated encryption device 100 according to the present exemplary embodiment are described below together with a reason for the above.

As shown in FIG. 1, the authenticated encryption device 100 according to the present exemplary embodiment includes a plaintext input means 110, an initial vector generation means 120, a first encryption means 130, a first computation means 140, a second encryption means 150, and a ciphertext output means 160. The authenticated encryption device 100 according to the present exemplary embodiment computes a checksum in order to generate a tag.

Respective means that are included in the authenticated encryption device 100 are described below. The plaintext input means 110 has a function of receiving plaintext M to be encrypted as an input.

The initial vector generation means 120 has a function of generating an initial vector that is different from a value of an initial vector that the initial vector generation means 120 itself has generated before. For example, the initial vector generation means 120 first outputs an arbitrary fixed value, and stores the output value. In a case where an initial vector is output a second time or later, the initial vector generation means 120 may output a value obtained by adding 1 to a value, that has been stored, of an initial vector that has been generated most recently.

In the case described above, when the initial vector generated most recently is N, a new initial vector N' is expressed in such a way that N'=N+1. Stated another way, processing of updating the initial vector N performed by the initial vector generation means 120 is expressed in such a way that updating function f(N)=N+1.

Furthermore, it is assumed that a data length of the initial vector N is n bits. If the initial vector N has a data length that is shorter than n bits, the initial vector generation means 120 appropriately performs padding on the initial vector N.

The first encryption means 130 has a function of performing encryption using a tweakable block cipher on the plaintext M that has been output by the plaintext input means 110, by using the initial vector N that has been output by the initial vector generation means 120.

Specifically, the first encryption means 130 adds a mask value that is uniquely determined by a tweak and a secret key to an input or an input and an output of a primitive for inputting/outputting n-bit data. The first encryption means 130 outputs a result of encryption as ciphertext C.

The first encryption means 130 can also achieve a tweakable block cipher by using a block cipher E for inputting/outputting normal n-bit data, or non-keyed cryptographic replacement P. For example, in a case where plaintext M includes m n-bit plaintext blocks M[1], M[2], . . . , and M[m] and the first encryption means 130 encrypts the plaintext M by using a tweakable block cipher of the XEX mode, a plaintext block M[i] (1<=i<=m) is encrypted by using a block cipher E that uses a secret key K, as described below.

$$C[i] = E\left(K, mult\left(2^i, E(K, N)\right) + M[i]\right) + mult\left(2^i, E(K, N)\right) \quad \text{Formula (10)}$$

Note that "+" in Formula (10) indicates a bitwise exclusive OR. Furthermore, mult(·, ·) in Formula (10) indicates the multiplication of two elements on the Galois field GF($2^n$). Furthermore, $2^i$ in Formula (10) indicates 2 raised to the i-th power on the Galois field GF($2^n$).

Furthermore, the first encryption means 130 can also achieve a tweakable block cipher by using LRW described in NPL 3 or the TEM mode described in NPL 5.

The first computation means 140 has a function of performing simple computation on the basis of a partial sequence of the plaintext M that has been output by the plaintext input means 110 and obtaining an s-bit checksum SUM, where s<n.

For example, the first computation means 140 may output, as a checksum SUM, an exclusive OR (XOR) of each corresponding bit of higher-order s bits in all of the plaintext blocks (each bit at the same position in the m plaintext blocks). If a final plaintext block has bits that is less than s bits, it is sufficient if the first computation means 140 performs appropriate padding on the final plaintext block, and computes a bitwise exclusive OR.

Furthermore, the first computation means 140 may compute a checksum SUM by using arithmetic addition, a cyclic code (cyclic redundancy check (CRC)), or the like, instead of exclusive OR.

The second encryption means 150 converts the s-bit checksum SUM that has been output by the first computation means 140 into an n-bit value, by using an appropriate padding function. In the padding function, it is sufficient, for example, if a portion that corresponds to a difference from n bits of the checksum SUM is padded in such a way that 100 . . . 0 is obtained.

Next, the second encryption means 150 performs encryption using a tweakable block cipher on the checksum SUM after conversion, by using the initial vector N that has been output by the initial vector generation means 120. Specifically, the second encryption means 150 adds a mask value that is uniquely determined by a tweak and a secret key to an input or an input and an output of a primitive for inputting/outputting n-bit data.

Next, the second encryption means 150 converts the encrypted checksum SUM into a t-bit value (t<=n), by using an appropriate shortening function. The t-bit value after conversion is a generated tag T. The shortening function is, for example, a function of only outputting a value of higher-order t bits in response to an input.

The second encryption means 150 may use a configuration method that is similar to a configuration method of a tweakable block cipher that is used by the first encryption means 130, such as LRW described in NPL 3, the XEX* mode described in NPL 4, or the TEM mode described in NPL 5. However, it is requested that the second encryption means 150 use a tweak that is different from a tweak used by the first encryption means 130, in a tweakable block cipher.

For example, in a case where the first encryption means 130 has used the respective tweaks (N, 1), (N, 2), . . . , and (N, m), it is sufficient if the second encryption means 150 performs encryption using a tweakable block cipher, by using the tweak (N, m+1). For example, the above example of computing a tag T is expressed as described below.

$$\text{SUM\_n} = SUM \| 10^{(n-s-1)} \quad \text{Formula (11)}$$

$$\text{Tag\_n} = E\left(K, mult\left(2^{(m+1)}, E(K, N)\right) + \text{SUM\_n}\right) \quad \text{Formula (12)}$$

$$T = \text{msb\_t}(\text{Tag\_n}) \quad \text{Formula (13)}$$

Note that the expression "A∥B" used in Formula (11) indicates a concatenation of character string A and character string B. Furthermore, $0^{(n-s-1)}$ in Formula (11) indicates a bit string in which (n−s−1) pieces of 0 are arranged. Note that $10^0=1$ is established. Furthermore, msb_t(·) in Formula (13) is a function of outputting a value of higher-order t bits in response to an input.

The ciphertext output means 160 has a function of connecting the ciphertext C that has been output by the first encryption means 130 and the tag T that has been output by the second encryption means 150 and performing an output.

[Description of Operation]

Figure 2:
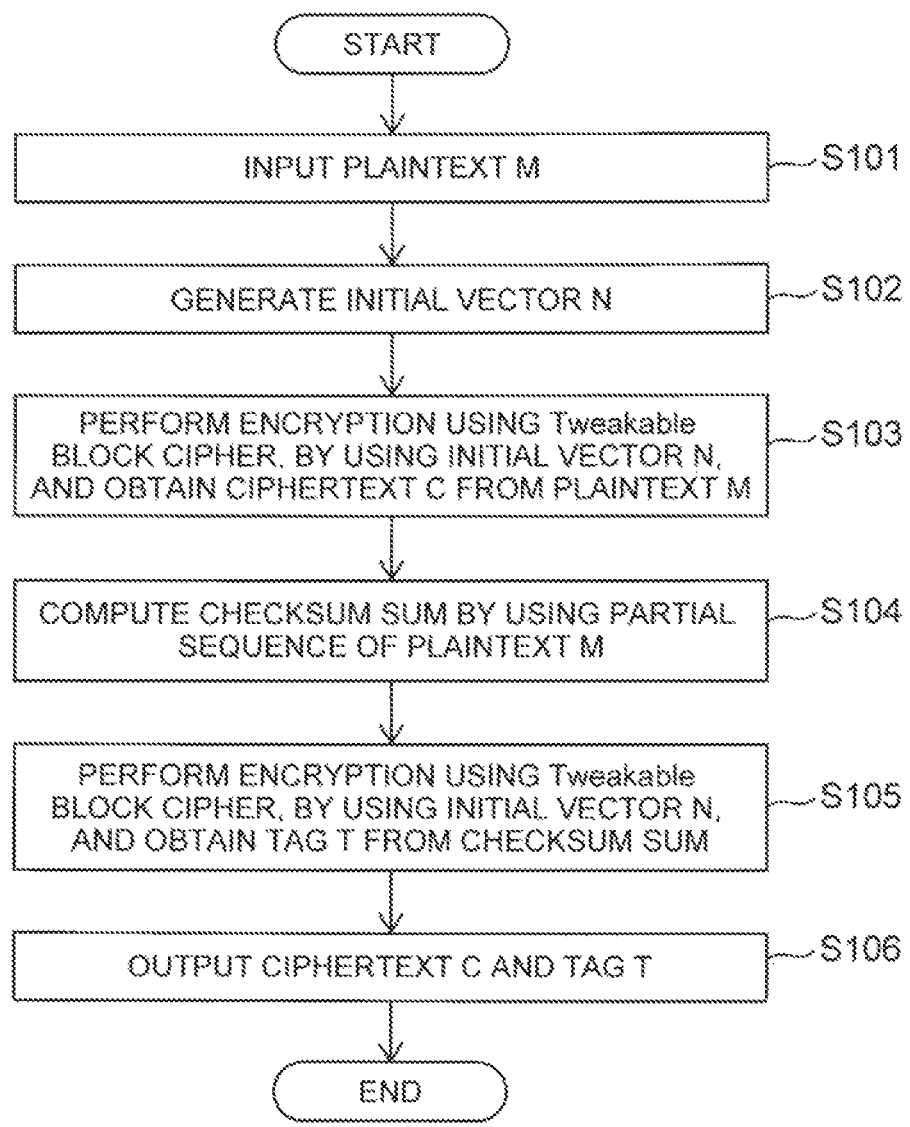
FIG. 2 is a flowchart showing an operation of an authenticated encryption processing by an authenticated encryption device 100 of the first exemplary embodiment.

An operation to perform authenticated encryption of the authenticated encryption device 100 according to the present exemplary embodiment is described below with reference to FIG. 2. FIG. 2 is a flowchart showing an operation of an authenticated encryption processing by the authenticated encryption device 100 of the first exemplary embodiment.

First, plaintext M to be encrypted is input to the plaintext input means 110 (step S101). The plaintext input means 110 inputs the input plaintext M to the first encryption means 130 and the second encryption means 150.

Next, the initial vector generation means 120 generates an initial vector N having a value that is different from a value of an initial vector generated in the past (step S102). The initial vector generation means 120 inputs the generated initial vector N to the first encryption means 130 and the second encryption means 150.

Next, the first encryption means 130 performs encryption using a tweakable block cipher on the plaintext M that has been input from the plaintext input means 110, by using the initial vector N that has been input from the initial vector generation means 120 (step S103). The first encryption means 130 inputs ciphertext C obtained in encryption to the ciphertext output means 160.

Next, the first computation means 140 performs simple computation on the basis of a partial sequence of the plaintext M that has been input from the plaintext input means 110, and obtains an s-bit checksum SUM, where s<n (step S104). The first computation means 140 inputs the obtained checksum SUM to the second encryption means 150.

Next, the second encryption means 150 converts the s-bit checksum SUM that has been input from the first computation means 140 into an n-bit value, by using an appropriate padding function. Next, the second encryption means 150 performs encryption using a tweakable block cipher on the checksum SUM after conversion, by using the initial vector N that has been input from the initial vector generation means 120.

Next, the second encryption means 150 converts the encrypted checksum SUM into a t-bit value, where t<=n, by using an appropriate shortening function, and generates a tag T (step S105). The second encryption means 150 inputs the generated tag T to the ciphertext output means 160.

Next, the ciphertext output means 160 connects the ciphertext C that has been input from the first encryption means 130 and the tag T that has been input from the second encryption means 150, and performs an output (step S106). After the output, the authenticated encryption device 100 terminates the authenticated encryption processing.

Description of Effects

The authenticated encryption device 100 according to the present exemplary embodiment can reduce a memory size required to compute a checksum in encryption processing in authenticated encryption from n bits to s bits, without reducing asymptotic security. Therefore, the authenticated encryption device 100 can reduce a state size by (n–s) bits while security is maintained.

Normally, a relationship between the state size and the security of encryption corresponds to a trade-off relationship. Stated another way, when the state size is reduced, the security of encryption decreases. However, in authenticated encryption processing performed by the authenticated encryption device 100 according to the present exemplary embodiment, asymptotic security at a time when n/2<=s<n is similar to asymptotic security at a time when s=n.

This is because, in asymptotic security at a time when s=n, an order of security according to a configuration of a tweakable block cipher that is used by the first encryption means 130 and the second encryption means 150 and an order of security according to a tag length are dominant.

Stated another way, an order of security derived from a bit length relating to checksum computation does not asymptotically distribute to security of the entirety of authenticated encryption. Accordingly, when a bit length s of a checksum satisfies that n/2<=s<n, an order of asymptotic security does not change.

However, in a case where s<n/2 is established and a tag length t satisfies that t>=n/2, an order of security derived from a bit length relating to checksum computation dominates security of the entirety of authenticated security. Therefore, asymptotic security is not maintained. In a case where a tag length t satisfies that t<n/2, if a bit length s of a checksum satisfies that s>=t, asymptotic security is not impaired.

Exemplary Embodiment 2

[Description of Configuration]

Figure 3:
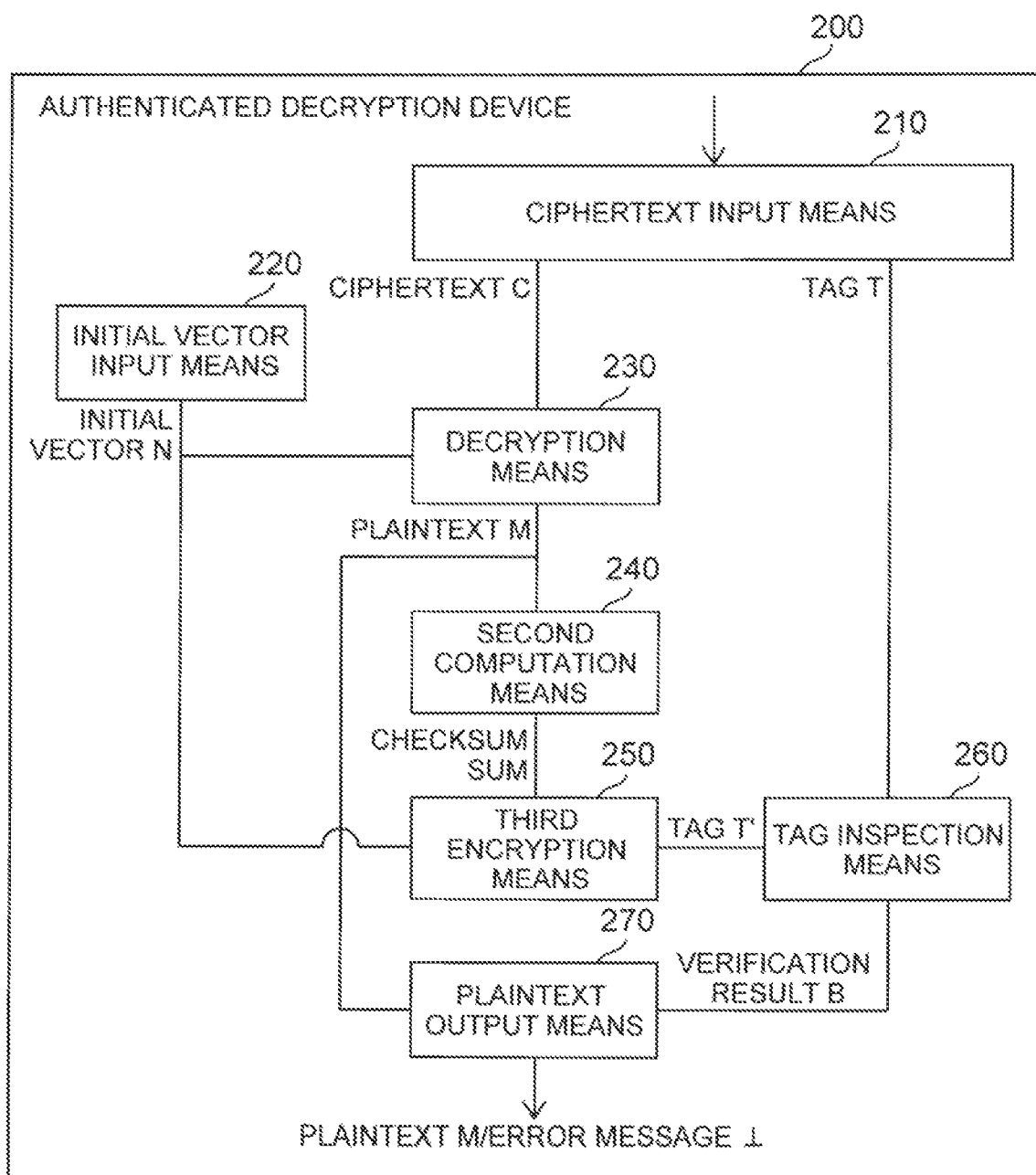
FIG. 3 is a block diagram showing a configuration example of an authenticated decryption device according to a second exemplary embodiment of the present invention.

Next, a second exemplary embodiment of an authenticated decryption device according to the present invention is described with reference to the drawings. FIG. 3 is a block diagram showing a configuration example of an authenticated decryption device according to the second exemplary embodiment of the present invention.

As shown in FIG. 3, an authenticated decryption device 200 according to the present exemplary embodiment includes a ciphertext input means 210, an initial vector input means 220, a decryption means 230, a second computation means 240, a third encryption means 250, a tag inspection means 260, and a plaintext output means 270.

Respective means that are included in the authenticated decryption device 200 are described below. The ciphertext input means 210 has a function of receiving, as an input, ciphertext C to be decrypted and a tag T that have been connected. Furthermore, the initial vector input means 220 has a function of receiving, as an input, an initial vector N to be used in decryption.

The decryption means 230 has a function of performing decryption using a tweakable block cipher on the ciphertext C that has been output by the ciphertext input means 210, by using the initial vector N that has been output by the initial vector input means 220.

Specifically, the decryption means 230 adds a mask value that is uniquely determined by a tweak and a secret key to an input or an input and an output of a primitive for inputting/outputting n-bit data. The decryption means 230 outputs a result of decryption as plaintext M.

The decryption means 230 acts as an inverse function of the first encryption means 130 according to the first exemplary embodiment. For example, in a case where ciphertext C includes m n-bit ciphertext blocks C[1], C[2], ..., and C[m] and the first encryption means 130 has encrypted plaintext M by using a tweakable block cipher of the XEX mode, C[i] (1<=i<=m) is decrypted by using a block cipher E using a secret key K and a decryption function D that corresponds to the block cipher E, as described below.

$$M[i] = D(K, mult(2^i, E(K, N)) + C[i]) + mult(2^i, E(K, N)) \quad \text{Formula (14)}$$

Note that "+" in Formula (14) indicates a bitwise exclusive OR. Furthermore, mult(·, ·) in Formula (14) indicates the multiplication of two elements on the Galois field $GF(2^n)$. Furthermore, $2^n$ in Formula (14) indicates 2 raised to the i-th power on the Galois field $GF(2^n)$.

The second computation means 240 has a function of performing simple computation on the basis of a partial sequence of the plaintext M that has been output by the decryption means 230 and obtaining an s-bit checksum SUM, where s<n. The function of the second computation means 240 is similar to a function of the first computation means 140 according to the first exemplary embodiment.

The third encryption means 250 converts the s-bit checksum SUM that has been output by the second computation means 240 into an n-bit value, by using an appropriate padding function.

Next, the third encryption means 250 performs encryption using a tweakable block cipher on the checksum SUM after conversion, by using the initial vector N that has been output by the initial vector input means 220. Specifically, the third encryption means 250 adds a mask value that is uniquely determined by a tweak and a secret key to an input or an input and an output of a primitive for inputting/outputting n-bit data.

Next, the third encryption means 250 converts the encrypted checksum SUM into a t-bit value (t<=n), by using an appropriate shortening function. The t-bit value after conversion is a generated tag T'. Stated another way, a function of the third encryption means 250 is similar to a function of the second encryption means 150 according to the first exemplary embodiment.

The tag inspection means 260 has a function of comparing the tag T that has been output by the ciphertext input means 210 with the tag T' that has been output by the third encryption means 250. In a case where the tag T and the tag T' that have been compared match each other, the tag inspection means 260 outputs a verification result B indicating "ACK".

Furthermore, in a case where the tag T and the tag T' that have been compared do not match each other, the tag inspection means 260 outputs a verification result B indicating "NCK". Note that "ACK" means "acknowledgement", and "NCK" means "non-acknowledgement".

The plaintext output means 270 receives, as an input, the plaintext M that has been output by the decryption means 230 and the verification result B that has been output by the tag inspection means 260. In a case where a verification result B indicating "ACK" has been input, the plaintext output means 270 outputs the plaintext M. Furthermore, in a case where a verification result B indicating "NCK" has been input, the plaintext output means 270 outputs an error message □.

[Description of Operation]

Figure 4:
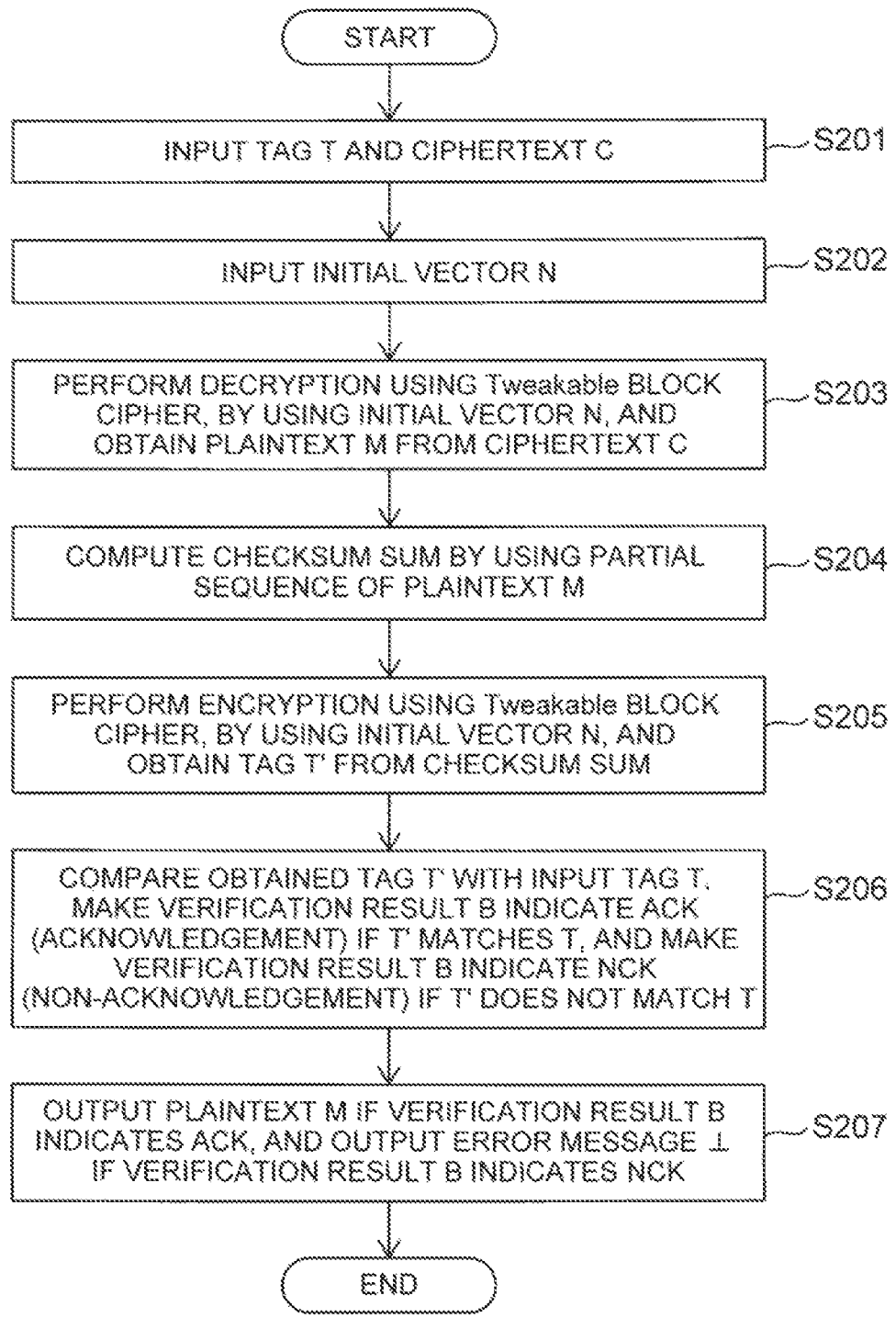
FIG. 4 is a flowchart showing an operation of an authenticated decryption processing by an authenticated decryption device 200 of the second exemplary embodiment.

An operation to perform authenticated decryption of the authenticated decryption device 200 according to the present exemplary embodiment is described below with reference to FIG. 4. FIG. 4 is a flowchart showing an operation of an authenticated decryption processing by the authenticated decryption device 200 of the second exemplary embodiment.

First, ciphertext C to be decrypted and a tag T are input to the ciphertext input means 210 (step S201). The ciphertext input means 210 inputs the input ciphertext C to the decryption means 230. Furthermore, the ciphertext input means 210 inputs the input tag T to the tag inspection means 260.

Next, an initial vector N to be used in decryption is input to the initial vector input means 220 (step S202). The initial vector input means 220 inputs the input initial vector N to the decryption means 230 and the third encryption means 250.

Next, the decryption means 230 performs decryption using a tweakable block cipher on the ciphertext C that has been input from the ciphertext input means 210, by using the initial vector N that has been input from the initial vector input means 220 (step S203). The decryption means 230 inputs decrypted plaintext M to the second computation means 240 and the plaintext output means 270.

Next, the second computation means 240 performs simple computation on the basis of a partial sequence of the plaintext M that has been input from the decryption means 230, and obtains an s-bit checksum SUM, where s<n (step S204). The second computation means 240 inputs the obtained checksum SUM to the third encryption means 250.

Next, the third encryption means 250 converts the s-bit checksum SUM that has been input from the second computation means 240 into an n-bit value, by using an appropriate padding function. Next, the third encryption means 250 performs encryption using a tweakable block cipher on the checksum SUM after conversion, by using the initial vector N that has been output by the initial vector input means 220.

Next, the third encryption means 250 converts the encrypted checksum SUM into a t-bit value, where t<=n, by using an appropriate shortening function, and generates a tag T' (step S205). The third encryption means 250 inputs the generated tag T' to the tag inspection means 260.

Next, the tag inspection means 260 compares the tag T that has been input from the ciphertext input means 210 with the tag T' that has been input from the third encryption means 250. In a case where the tag T and the tag T' that have been compared match each other, the tag inspection means 260 inputs a verification result B indicating "ACK" to the plaintext output means 270. Furthermore, in a case where the tag T and the tag T' that have been compared do not match each other, the tag inspection means 260 inputs a verification result B indicating "NCK" to the plaintext output means 270 (step S206).

Next, in a case where the verification result B that has been input from the tag inspection means 260 indicates "ACK", the plaintext output means 270 outputs the plaintext M that has been input from the decryption means 230. Furthermore, in a case where the verification result B that has been input from the tag inspection means 260 indicates "NCK", the plaintext output means 270 outputs an error message Q (step S207). After the plaintext M or the error message D has been output, the authenticated decryption device 200 terminates the authenticated decryption processing.

Description of Effects

The authenticated decryption device 200 according to the present exemplary embodiment can reduce a memory size required to compute a checksum in decryption processing in authenticated encryption from n bits to s bits, without reducing asymptotic security. Therefore, the authenticated decryption device 200 can reduce a state size by (n−s) bits while security is maintained.

Stated another way, the authenticated decryption device 200 exhibits an effect that is similar to an effect exhibited by the authenticated encryption device 100 according to the first exemplary embodiment, in decryption processing in authenticated encryption. Furthermore, a reason the authenticated decryption device 200 exhibits the effect described above is similar to a reason the authenticated encryption device 100 exhibits an effect.

Several specific examples of the authenticated encryption device 100 according to the first exemplary embodiment and the authenticated decryption device 200 according to the second exemplary embodiment are described below.

Specific Example 1

An authenticated encryption device 100 and an authenticated decryption device 200 in this specific example can be applied to OCB described in PTL 1 to PTL 4 or OPP described in NPL 6. Specific functions of respective means that are included in the authenticated encryption device 100 in this specific example are individually described below.

First, it is assumed that plaintext M that is output by the plaintext input means 110 of the authenticated encryption device 100 includes (m−1) n-bit plaintext blocks M[1], M[2], . . . , and M[m−1], and an n'-bit plaintext block M[m], where n'<=n.

The first encryption means 130 of the authenticated encryption device 100 performs encryption using a tweakable block cipher TE on the plaintext M, by using an initial vector N that has been output by the initial vector generation means 120 of the authenticated encryption device 100.

Specifically, the first encryption means 130 adds a mask value that is uniquely determined by a tweak and a secret key to an input or an input and an output of a block cipher for inputting/outputting n-bit data, or an input or an input and an output of non-keyed cryptographic replacement.

For example, the first encryption means 130 encrypts the plaintext blocks M[1], M[2], . . . , and M[m−1] by using a secret key K and the tweak (N, i) (1<=i<m) in such a way that C[i]=TE(K, (N, i), M[i]).

Furthermore, the first encryption means 130 encrypts the plaintext block M[m] by using an n-bit fixed value Fix, the secret key K, and the tweak (N, m) in such a way that C[m]=TE(K, (N, m), Fix)+M[m]. Finally, the first encryption means 130 generates ciphertext C in such a way that C=C[1]C[2] . . . C[m].

For example, in a case where encryption is performed using a tweakable block cipher of the XEX* mode, the first encryption means 130 encrypts the plaintext block M[i] (1<=i<m), as described below.

$$C[i]=E(K,\text{mult}(2^i,E(K,N))+M[i])+\text{mult}(2^i,E(K,N)) \quad \text{Formula (15)}$$

Furthermore, the first encryption means 130 encrypts the plaintext block M[m], as described below.

$$C[m]=M[m]+msb\_n'(\text{Pad}\_n)(\text{Pad})n=E(K,\text{mult}(2^m,E(K,N))+0^n)) \quad \text{Formula (16)}$$

Note that "+" in Formulae (15) and (16) indicates a bitwise exclusive OR. Furthermore, mult(·, ·) in Formulae (15) and (16) indicates the multiplication of two elements on the Galois field $GF(2^n)$. Furthermore, $2^i$ in Formula (15) indicates 2 raised to the i-th power on the Galois field $GF(2^n)$. Furthermore, "$0^n$" in Formula (16) indicates a bit string in which n pieces of 0 are arranged. Furthermore, msb_n'(·) in Formula (16) is a function of outputting a value of higher-order n' bits in response to an input.

Furthermore, the first computation means 140 of the authenticated encryption device 100 adds a partial sequence $M_s[i]$ of arbitrary s bits, where s<n, of a plaintext block M[i] of plaintext M that has been output by the plaintext input means 110 of the authenticated encryption device 100.

Specifically, the first computation means 140 determines a bitwise exclusive OR of $M_s[1]$, $M_s[2]$, . . . , and $M_s[m−1]$ to be a checksum SUM. Next, the first computation means 140 outputs an s-bit checksum SUM and a final plaintext block M[m].

For example, in order to convert M[i] into $M_s[i]$, it is sufficient if the first computation means 140 extracts a value of higher-order s bits of M[i]. In a case where the value of higher-order s bits of M[i] is extracted, the first computation means 140 computes a checksum SUM as described below.

$$SUM = \text{msb\_s}(M[1]) + \text{msb\_s}(M[2]) + \ldots + \text{msb\_s}(M[m-1]) \quad \text{Formula (17)}$$

Furthermore, the second encryption means 150 of the authenticated encryption device 100 converts the s-bit checksum SUM that has been output by the first computation means 140 of the authenticated encryption device 100 into an n-bit value, by using an appropriate padding function.

Next, the second encryption means 150 performs encryption using a tweakable block cipher on the checksum SUM after conversion, by using the initial vector N that has been output by the initial vector generation means 120 and the n'-bit plaintext block M[m] that has been output by the first computation means 140.

Specifically, the second encryption means 150 adds, to an input or an input and an output of a primitive for inputting/outputting n-bit data, a mask value that is uniquely determined by a tweak that is selectively used according to a case where n'=n or a case where n'≠n and a secret key, and M[m] that has been converted into an n-bit value according to an appropriate padding function.

Next, the second encryption means 150 converts the encrypted checksum SUM into a t-bit value (t<=n), by using an appropriate shortening function, and generates a tag T.

For example, in a case where the first encryption means 130 of the authenticated encryption device 100 has used the respective tweaks (N, 1), (N, 2), . . . , and (N, m), it is sufficient if the second encryption means 150 uses the tweak (N, m, 1) when n'=n, and uses the tweak (N, m, 2) when n'≠n.

For example, when n'≠n, encryption using a tweakable block cipher of the XEX* mode performed by the second encryption means 150 is expressed by the formulae described below.

$$\text{Mask}=\Delta(K,(N,m,2))+(M[m]\|10^{(n-n'-1)})$$

$$SUM\_n=SUM\|0^{(n-s)}$$

$$Tag\_n=E(K,\text{Mask}+SUM\_n)$$

$$T=\text{msb\_t}(Tag\_n)$$

Next, specific functions of respective means that are included in the authenticated decryption device 200 in this specific example are individually described. First, it is assumed that ciphertext C that is output by the ciphertext input means 210 of the authenticated decryption device 200 includes (m−1) n-bit ciphertext blocks C[1], C[2], . . . , and C[m−1], and an n'-bit ciphertext block C[m], where n'<=n.

The decryption means 230 of the authenticated decryption device 200 acts as an inverse function of the first encryption means 130 of the authenticated encryption device 100. Stated another way, the decryption means 230 performs decryption using a tweakable block cipher TE on the ciphertext C, by using an initial vector N that has been output by the initial vector input means 220 of the authenticated decryption device 200. Specifically, the decryption means 230 adds a mask value that is uniquely determined by a tweak and a secret key to an input or an input and an output of a primitive for inputting/outputting n-bit data.

For example, the decryption means 230 decrypts the ciphertext blocks C[1], C[2], . . . , and C[m−1] by using a secret key K, the tweak (N, i) (1<=i<m), and a decryption function TD of the tweakable block cipher TE in such a way that M[i]=TD(K, (N, i), C[i]).

Furthermore, the decryption means 230 decrypts the ciphertext block C[m] by using an n-bit fixed value Fix, the secret key K, and the tweak (N, m) in such a way that M[m]=TE(K, (N, m), Fix)+C[m]. Finally, the decryption means 230 generates plaintext M in such a way that M=M[1]M[2] ... M[m].

For example, in a case where the first encryption means 130 of the authenticated encryption device 100 has encrypted plaintext M by using a tweakable block cipher of the XEX* mode, the decryption means 230 can decrypt a ciphertext block C[i] (1<=i<m) by using a block cipher E that includes a secret key K and a decryption function D that corresponds to the block cipher E, as described below.

$$M[i]=D(K,\text{mult}(2^i,E(K,N))+C[i])+\text{mult}(2^i,E(K,N)) \quad \text{Formula (18)}$$

Furthermore, the decryption means 230 can decrypt the ciphertext block C[m], as described below.

$$M[m]=C[m]+msb\_n'(\text{Pad}\_n)(\text{Pad}\_n=E(K,\text{mult}(2^m,E(K,N))+0^n)) \quad \text{Formula (19)}$$

Furthermore, the second computation means 240 of the authenticated decryption device 200 adds a partial sequence $M_s[i]$ of arbitrary s bits, where s<n, of a plaintext block M[i] of plaintext M that has been output by the decryption means 230 of the authenticated decryption device 200.

Specifically, the second computation means 240 determines an exclusive OR of $M_s[1]$, M[2], ..., and $M_s[m-1]$ to be a checksum SUM. Next, the second computation means 240 outputs an s-bit checksum SUM and a final plaintext block M[m]. Stated another way, processing performed by the second computation means 240 is similar to processing performed by the first computation means 140 of the authenticated encryption device 100.

Furthermore, the third encryption means 250 of the authenticated decryption device 200 converts the s-bit checksum SUM that has been output by the second computation means 240 of the authenticated decryption device 200 into an n-bit value, by using an appropriate padding function.

Next, the third encryption means 250 performs encryption using a tweakable block cipher on the checksum SUM after conversion, by using the initial vector N that has been output by the initial vector input means 220 and the n'-bit plaintext block M[m] that has been output by the second computation means 240.

Specifically, the third encryption means 250 adds, to an input or an input and an output of a primitive for inputting/outputting n-bit data, a mask value that is uniquely determined by a tweak that is selectively used according to a case where n'=n or a case where n'≠n and a secret key, and M[m] that has been converted into an n-bit value according to an appropriate padding function.

Next, the third encryption means 250 converts the encrypted checksum SUM into a t-bit value (t<=n), by using an appropriate shortening function, and generates a tag T'. Stated another way, processing performed by the third encryption means 250 is similar to processing performed by the second encryption means 150 of the authenticated encryption device 100.

Figure 5:
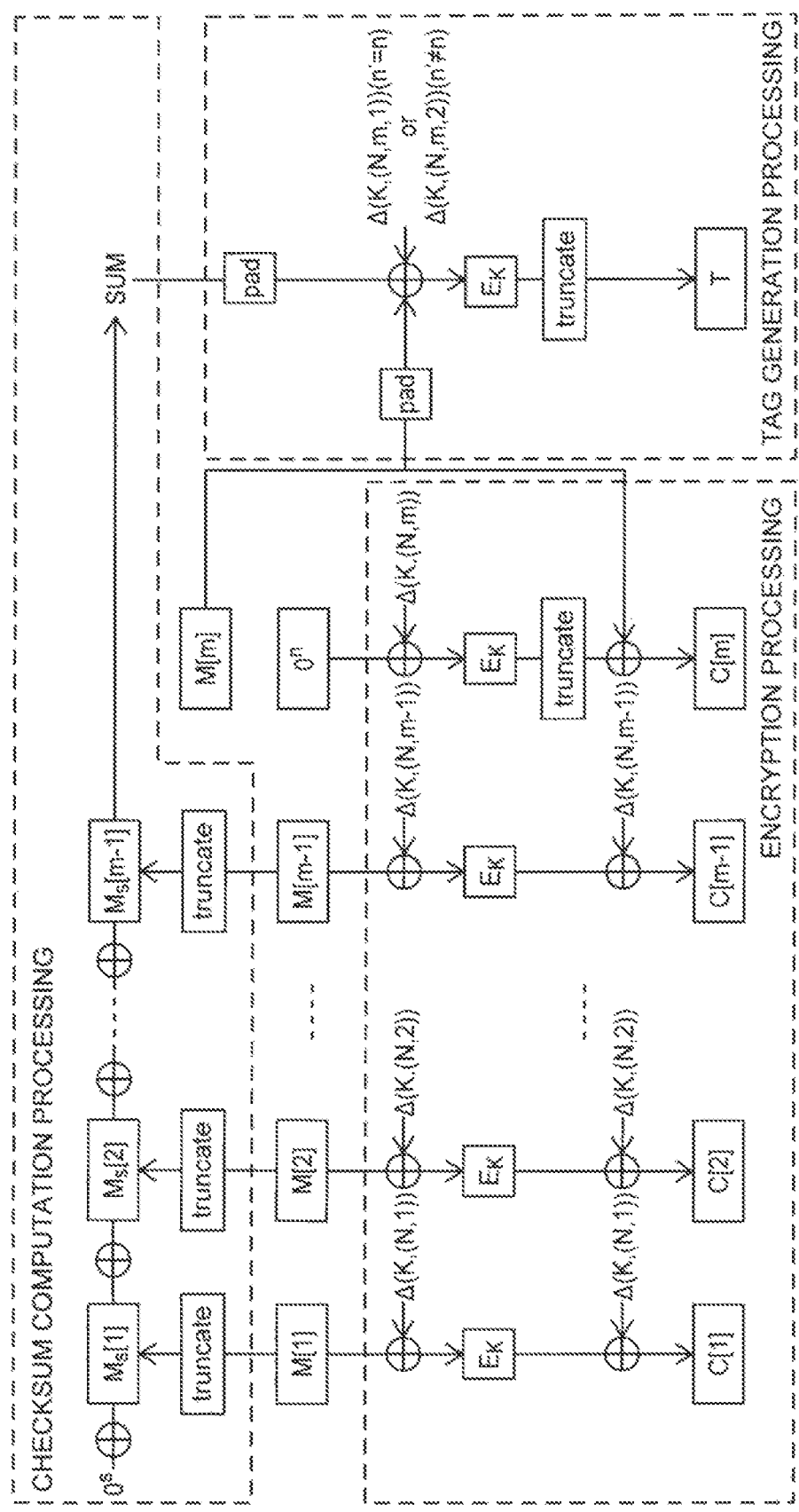
FIG. 5 is an explanatory diagram showing a specific example of the authenticated encryption processing by the authenticated encryption device 100.

FIG. 5 is an explanatory diagram showing a specific example of the authenticated encryption processing by the authenticated encryption device 100.

For example, the first encryption means 130 of the authenticated encryption device 100 performs the encryption processing shown in FIG. 5. Stated another way, the first encryption means 130 performs encryption using a tweakable block cipher TE on (m−1) n-bit plaintext blocks M[1], M[2], ..., and M[m−1] and an n'-bit plaintext block M[m], where n'<=n that constitute the plaintext M, by using the initial vector N that has been output by the initial vector generation means 120.

As shown in FIG. 5, the first encryption means 130 encrypts the plaintext blocks M[1], M[2], ..., and M[m−1] by using a secret key K and Δ(K, (N, i)) (1<=i<m), as described below.

$$C[i]=E(K,\Delta(K,(N,i))+M[i])+\Delta(K,(N,i))$$

Furthermore, as shown in FIG. 5, the first encryption means 130 encrypts the plaintext block M[m] by using an n-bit fixed value Fix, the secret key K, and Δ(K, (N, m)), as described below.

$$C[m]=M[m]+msb\_n'(\text{Pad}\_n)(\text{Pad}\_n=E(K,\Delta(K,(N,m))+0^n))$$

Finally, the first encryption means 130 generates ciphertext C in such a way that C=C[1]C[2] ... C[m].

Note that decryption processing performed by the decryption means 230 of the authenticated decryption device 200 on ciphertext C that has been output by the ciphertext input means 210 is reverse processing of the encryption processing shown in FIG. 5.

Furthermore, the first computation means 140 of the authenticated encryption device 100 performs the checksum computation processing shown in FIG. 5. Stated another way, the first computation means 140 computes a bitwise exclusive OR of the partial sequences $M_s[1]$, $M_s[2]$, ..., and $M_s[m-1]$ of arbitrary s bits, where s<n, of a plaintext block M[i] of plaintext M that has been output by the plaintext input means 110 of the authenticated encryption device 100. For example, the first computation means 140 performs computation according to Formula (17).

The first computation means 140 determines the bitwise exclusive OR to be a checksum SUM. Next, the first computation means 140 outputs an s-bit checksum SUM and a final plaintext block M[m]. Note that checksum computation processing performed by the second computation means 240 of the authenticated decryption device 200 on plaintext M that has been output by the decryption means 230 is also similar to the checksum computation processing shown in FIG. 5.

Furthermore, the second encryption means 150 of the authenticated encryption device 100 performs the tag generation processing shown in FIG. 5. Stated another way, the second encryption means 150 converts the s-bit checksum SUM that has been output by the first computation means 140 of the authenticated encryption device 100 into an n-bit value, by using an appropriate padding function.

Next, the second encryption means 150 performs encryption using a tweakable block cipher on the checksum SUM after conversion, by using the initial vector N that has been output by the initial vector generation means 120 and the n'-bit plaintext block M[m] that has been output by the first computation means 140.

As shown in FIG. 5, the second encryption means 150 selectively uses a mask value that will be added to an input or an input and an output of a primitive for inputting/outputting n-bit data and that is uniquely determined by a tweak and a secret key, according to a case where n'=n or a case where n'≠n. Furthermore, the second encryption means 150 also adds M[m] that has been converted into an n-bit value according to an appropriate padding function.

Furthermore, as shown in FIG. 5, the second encryption means 150 converts the encrypted checksum SUM into a t-bit value (t<=n), by using an appropriate shortening function, and generates a tag T. Note that tag generation processing performed by the third encryption means 250 of the authenticated decryption device 200 on an s-bit checksum SUM that has been output by the second computation means 240 is also similar to the tag generation processing shown in FIG. 5.

Furthermore, the first computation means 140 of the authenticated encryption device 100 in this specific example may compute a checksum as described below, and the second encryption means 150 may generate a tag as described below. A variation of this specific example is described below.

The first computation means 140 computes, for M[1] to M[m−1], a bitwise exclusive OR of a partial sequence of arbitrary n/2 bits of a plaintext block M[i] of plaintext M that has been output by the plaintext input means 110 of the authenticated encryption device 100. Next, the first computation means 140 determines the bitwise exclusive OR to be a checksum SUM, and outputs an n/2-bit checksum SUM and a final plaintext block M[m].

Next, the second encryption means 150 of the authenticated encryption device 100 converts the n/2-bit checksum SUM that has been output by the first computation means 140 into an n-bit value, by using an appropriate padding function.

Next, the second encryption means 150 performs encryption using a tweakable block cipher on the checksum SUM after conversion, by using an initial vector N that has been output by the initial vector generation means 120 and an n'-bit plaintext block M[m] that has been output by the first computation means 140.

Specifically, the second encryption means 150 adds, to an input or an input and an output of a primitive for inputting/outputting n-bit data, a mask value that is uniquely determined by a tweak and a secret key, and M[m] that has been converted into an n-bit value according to an appropriate padding function.

Next, the second encryption means 150 divides Tag_n of n bits that has been obtained in encryption into two n/2-bit pieces Tag1 and Tag2, by using an appropriate division function. Next, the second encryption means 150 generates an n/2-bit tag T in such a way that T=Tag1 when n'=n and T=Tag2 when n'≠n. For example, the tag T is generated as described below.

$$T = \text{Tag1} = (\text{msb\_}(n/2))(\text{Tag\_n})(n' = n) \quad \text{Formula (20)}$$

$$T = \text{Tag2} = (\text{lsb\_}(n/2))(\text{Tag\_n})(n' \neq n) \quad \text{Formula (21)}$$

Note that (msb_(n/2))(·) in Formula (20) is a function of outputting a value of higher-order n/2 bits in response to an input. Furthermore, (lsb_(n/2))(·) in Formula (21) is a function of outputting a value of lower-order n/2 bits in response to an input.

In a case where the second encryption means 150 uses a division function, a tweak to be used is not selected according to cases. A tweak to be used is selected according to cases in order to be able to determine whether padding processing has been performed on plaintext.

However, in a case where a length of a tag is n/2 bits, the second encryption means 150 can perform selection according to cases, even after an n-bit result of encrypting a checksum by using a tweakable cipher has been divided into two pieces. An encrypted n/2-bit value to be used is selected according to cases more efficiently than a tweak to be used.

Note that the second computation means 240 of the authenticated decryption device 200 in this specific example may also compute a checksum on the basis of plaintext M that has been output by the decryption means 230, by performing checksum computation processing that is similar to the checksum computation processing described above performed by the first computation means 140 of the authenticated encryption device 100.

Furthermore, the third encryption means 250 of the authenticated decryption device 200 in this specific example may also generate an n/2-bit tag T' on the basis of a checksum SUM that has been output by the second computation means 240, by performing tag generation processing that is similar to the tag generation processing described above performed by the second encryption means 150 of the authenticated encryption device 100. In the variation described above, selection of a tweak to be used according to cases is omitted.

Description of Effects

If a checksum is computed from s-bit blocks, where s<n is necessarily established, as described in the first exemplary embodiment and the second exemplary embodiment, security fails to be maintained, and a tag is easily falsified.

A final block according to an authenticated encryption scheme in the first specific example is a block of the CTR mode. In order to prevent a tag from being falsified and maintain security, it is requested that the entirety of a final plaintext block M[m] of n' bits, where n'<=n, that is, an n'-bit value, be added to a checksum SUM.

However, when an n'-bit value is added to a checksum SUM, the bit number of an obtained checksum SUM is the greater of s bits and n' bits. In a case where n'>s, an effect of reducing a state size by (n−s) bits that would be expected in the first exemplary embodiment and the second exemplary embodiment fails to be exhibited.

Therefore, if only the final plaintext block M[m] is added to a mask value to be used in a tweakable block cipher, security and efficiency are simultaneously achieved.

Security in a case where n/2<=s<n in the authenticated encryption device 100 and the authenticated decryption device 200 in the first specific example is asymptotically equal to security in a case where s=n, similarly to the first exemplary embodiment and the second exemplary embodiment.

Security in OCB in a case where s=n/2 is described below. In the case of encryption in processing units of one block, a state size in normal OCB is 3n bits, as described above. Furthermore, a state size according to a scheme achieved in the first specific example that has been applied to OCB is 2.5n bits in both encryption and decryption. Stated another way, a state size of 0.5n bits is reduced.

Furthermore, in the case of encryption in processing units of arbitrary i blocks, a state size in normal OCB is (2i+1)n bits. Furthermore, a state size according to a scheme achieved in the first specific example that has been applied to OCB is (2i+0.5)n bits in both encryption and decryption. Similarly, a state size of 0.5n bits is reduced.

Furthermore, an order of asymptotic security is $O(2^{(n/2)})$ in both a scheme in normal OCB and a scheme achieved in the first specific example that has been applied to OCB. Stated another way, a state size is reduced by 0.5n bits in both encryption processing and decryption processing, without impairing asymptotic security. Therefore, the authenticated encryption device 100 and the authenticated decryption device 200 in the first specific example can simultaneously achieve security and efficiency.

Specific Example 2

An authenticated encryption device 100 and an authenticated decryption device 200 in this specific example can be applied to OTR described in PTL 5. Specific functions of respective means that are included in the authenticated encryption device 100 in this specific example are individually described below.

First, it is assumed that plaintext M that is output by the plaintext input means 110 of the authenticated encryption device 100 includes (m−1) n-bit plaintext blocks M[1], M[2], . . . , and M[m−1], and an n'-bit plaintext block M[m], where n'<=n. Furthermore, it is assumed that m is an even number and m/2=hm.

First the encryption means 130 of the authenticated encryption device 100 performs encryption using a tweakable block cipher TE on the plaintext M, by using an initial vector N that has been output by the initial vector generation means 120 of the authenticated encryption device 100.

Specifically, the first encryption means 130 adds a mask value that is uniquely determined by a tweak and a secret key to an input or an input and an output of a block cipher for inputting/outputting n-bit data, or an input or an input and an output of non-keyed cryptographic replacement.

For example, the first encryption means 130 encrypts each of the plaintext blocks by using a secret key K and the tweak (N, j, 0) or (N, j, 1) (1<=j<=hm−1), as described below.

$$C[2j-1] = TE(K, (N, j, 0), M[2j-1]) + M[2j] \quad \text{Formula (22)}$$

$$C[2j] = TE(K, (N, j, 1), C[2j-1]) + M[2j-1] \quad \text{Formula (23)}$$

$$C[m] = TE(K, (N, hm, 0), M[m-1]) + M[m] \quad \text{Formula (24)}$$

$$C[m-1] = TE(K, (N, hm, 1), C[m]) + M[m-1] \quad \text{Formula (25)}$$

Finally, the first encryption means 130 generates ciphertext C in such a way that C=C[1]C[2] . . . C[m].

Note that, in a case where m is an odd number, the first encryption means 130 encrypts M[1], . . . , and M[m−1] as described above. Next, the first encryption means 130 encrypts M[m] by adding Pad_n of n bits in which a fixed value has been encrypted using a tweakable block cipher to M[m]. When n'≠n, the first encryption means 130 converts Pad_n into an n-bit value by using an appropriate shortening function.

For example, in a case where m is an odd number, it is assumed that hm=(m+1)/2. The first encryption means 130 performs encryption using a tweakable block cipher of the XE mode on the plaintext blocks M[1], M[2], . . . , and M[m−1] and the n'-bit plaintext block M[m], where n'<=n, by using a secret key K and the tweak (N, j, 0) or (N, j, 1) (1<=j<=hm−1), as described below.

$$C[2j-1] = E(K, \Delta(K, (N, j, 0)) + M[2j-1]) + M[2j] \quad \text{Formula (26)}$$

$$C[2j] = E(K, \Delta(K, (N, j, 1)) + C[2j-1]) + M[2j-1] \quad \text{Formula (27)}$$

$$C[m] = \text{msb\_n}'(\text{Pad\_n}) + \quad \text{Formula (28)}$$

$$M[m](\text{Pad\_n} = E(K, \Delta(K, (N, hm, 0)) + 0^n))$$

Note that "+" in Formulae (26) to (28) indicates a bitwise exclusive OR. Furthermore, $\Delta(K, Tw)$ in Formulae (26) to (28) is an n-bit mask value that is uniquely determined by a secret key K and a tweak Tw. Furthermore, "$0^n$" in Formula (28) indicates a bit string in which n pieces of 0 are arranged. Furthermore, msb_n'(·) in Formula (28) is a function of outputting a value of higher-order n' bits in response to an input.

Furthermore, the first computation means 140 of the authenticated encryption device 100 performs computation in such a way that Z=TE(K, (N, hm, 0), M[m−1]), by using the plaintext M that has been output by the plaintext input means 110 of the authenticated encryption device 100, the initial vector N that has been output by the initial vector generation means 120, and a tweakable block cipher TE.

Specifically, the first computation means 140 adds a mask value that is uniquely determined by a tweak and a secret key to an input or an input and an output of a block cipher for inputting/outputting n-bit data, or an input or an input and an output of non-keyed cryptographic replacement.

The first computation means 140 computes an s-bit checksum SUM by adding a partial sequence $M_s[2i]$ of arbitrary s bits, where s<n, of M[2i] (i=1, . . . , hm−1) to a partial sequence of arbitrary s bits of Z that has been computed.

For example, in order to convert M[2i] into $M_s[2i]$, it is sufficient if the first computation means 140 extracts a value of higher-order s bits of M[2i]. In a case where the value of higher-order s bits is extracted, the first computation means 140 computes a checksum SUM as described below.

$$SUM = \text{msb\_s}(M[2]) + \quad \text{Formula (29)}$$

$$\text{msb\_s}(M[4]) + \ldots + \text{msb\_s}(M[m-2]) + \text{msb\_s}(Z)$$

Furthermore, in a case where m is an odd number, it is assumed that hm=(m+1)/2. The first computation means 140 computes a bitwise exclusive OR of a partial sequence $M_s[2i]$ of arbitrary s bits, where s<n, of M[2i] (i=1, . . . , hm−1).

The first computation means 140 computes a checksum SUM by converting the bitwise exclusive OR into an n'-bit value by using an appropriate padding function, and adding a converted value to the n'-bit plaintext block M[m]. The first computation means 140 outputs the computed checksum SUM.

Furthermore, the second encryption means 150 of the authenticated encryption device 100 converts the s-bit checksum SUM that has been output by the first computation means 140 of the authenticated encryption device 100 into an n-bit value, by using an appropriate padding function.

Next, the second encryption means 150 performs encryption using a tweakable block cipher on the checksum SUM after conversion, by using the initial vector N that has been output by the initial vector generation means 120.

Specifically, the second encryption means 150 adds a mask value that is uniquely determined by a tweak and a secret key to an input or an input and an output of a block cipher for inputting/outputting n-bit data, or an input or an input and an output of non-keyed cryptographic replacement. A tweak is selectively used according to each of the four cases obtained by combining a case where m is an even number or a case where m is an odd number with a case where n'=n or a case where n'≠n.

Next, the second encryption means 150 converts the encrypted checksum SUM into a t-bit value (t<=n), by using an appropriate shortening function, and generates a tag T.

For example, it is assumed that the first encryption means 130 of the authenticated encryption device 100 has used the respective tweaks (N, 1, 0), (N, 1, 1), (N, 2, 0), (N, 2, 1), . . . , (N, hm, 0), and (N, hm, 1). It is sufficient if the second encryption means 150 of the authenticated encryption device 100 uses the tweak (N, hm, 3, 0) when m is an even number and n'=n, and uses the tweak (N, hm, 1, 1) when m is an even number and n'≠n.

Furthermore, it is sufficient if the second encryption means 150 uses the tweak (N, hm, 2, 0) when m is an odd number and n'=n, and uses the tweak (N, hm, 0, 1) when m is an odd number and n'≠n.

For example, when m is an even number and n'≠n, encryption using a tweakable block cipher of the XE mode performed by the second encryption means 150 is expressed by the formulae described below.

$$SUM\_n = SUM \| 0^{(n-s)}$$

$$Tag\_n = E(K, \Delta(K, (N, hm, 1, 1)) + SUM\_n)$$

$$T = msb\_t(Tag\_n)$$

Next, specific functions of respective means that are included in the authenticated decryption device 200 in this specific example are individually described. First, it is assumed that ciphertext C that is output by the ciphertext input means 210 of the authenticated decryption device 200 includes (m−1) n-bit ciphertext blocks C[1], C[2], . . . , and C[m−1], and an n'-bit ciphertext block C[m], where n'<=n. Furthermore, it is assumed that m is an even number and m/2=hm.

The decryption means 230 of the authenticated decryption device 200 acts as an inverse function of the first encryption means 130 of the authenticated encryption device 100. Stated another way, the decryption means 230 performs decryption using a tweakable block cipher TE on the ciphertext C, by using an initial vector N that has been output by the initial vector input means 220 of the authenticated decryption device 200.

Specifically, the decryption means 230 adds a mask value that is uniquely determined by a tweak and a secret key to an input or an input and an output of a block cipher for inputting/outputting n-bit data, or an input or an input and an output of non-keyed cryptographic replacement.

For example, the decryption means 230 decrypts each of the ciphertext blocks by using a secret key K and the tweak (N, j, 0) or (N, j, 1) (1<=j<=hm−1), as described below.

$$M[2j-1] = TE(K, (N, j, 1), C[2j-1]) + C[2j]$$

$$M[2j] = TE(K, (N, j, 0), M[2j-1]) + C[2j-1]$$

$$M[m-1] = TE(K, (N, hm, 1), C[m]) + C[m-1]$$

$$M[m] = TE(K, (N, hm, 0), M[m-1]) + C[m]$$

Finally, the decryption means 230 generates plaintext M in such a way that M=M[1]M[2] . . . M[m]. For example, the decryption means 230 performs decryption using a tweakable block cipher of the XE mode, by using a secret key K and the tweak (N, j, 0) or (N, j, 1) (1<=j<=hm−1), as described below.

$$M[2j-1] = E(K, \Delta(K, (N, j, 1)) + C[2j-1]) + C[2j] \quad \text{Formula (30)}$$

$$M[2j] = E(K, \Delta(K, (N, j, 0)) + M[2j-1]) + C[2j-1] \quad \text{Formula (31)}$$

$$M[m-1] = E(K, \Delta(K, (N, hm, 1)) + (C[m] \| 10^{(n-n'-1)})) + C[m-1] \quad \text{Formula (32)}$$

$$M[m] = msb\_n'(E(K, \Delta(K, (N, hm, 0)) + M[m-1])) + C[m] \quad \text{Formula (33)}$$

Note that "+" in Formulae (30) to (33) indicates a bitwise exclusive OR. Furthermore, Δ(K, Tw) in Formulae (30) to (33) is an n-bit mask value that is uniquely determined by a secret key K and a tweak Tw. Furthermore, "0'"" in Formula (32) indicates a bit string in which n pieces of 0 are arranged. Furthermore, msb_n'(·) in Formula (33) is a function of outputting higher-order n' bits in response to an input.

Furthermore, it is assumed that plaintext M that has been output by the decryption means 230 of the authenticated decryption device 200 includes (m−1) n-bit plaintext blocks M[1], M[2], . . . , and M[m−1], and an n'-bit plaintext block M[m], where n'<=n. Furthermore, it is assumed that m is an even number and m/2=hm.

Furthermore, the second computation means 240 of the authenticated decryption device 200 performs computation in such a way that Z=TE(K, (N, hm, 0), M[m−1]), by using the plaintext M that has been output by the decryption means 230 of the authenticated decryption device 200, the initial vector N that has been output by the initial vector input means 220, and a tweakable block cipher TE.

Specifically, the second computation means 240 adds a mask value that is uniquely determined by a tweak and a secret key to an input or an input and an output of a block cipher for inputting/outputting n-bit data, or an input or an input and an output of non-keyed cryptographic replacement.

The second computation means 240 computes an s-bit checksum SUM by adding a partial sequence $M_s[2i]$ of arbitrary s bits, where s<n, of M[2i] (i=1, . . . , hm−1) to a partial sequence of arbitrary s bits of Z that has been computed. Stated another way, checksum computation processing performed by the second computation means 240 is similar to checksum computation processing performed by the first computation means 140 of the authenticated encryption device 100.

Furthermore, the third encryption means 250 of the authenticated decryption device 200 converts the s-bit checksum SUM that has been output by the second computation means 240 of the authenticated decryption device 200 into an n-bit value, by using an appropriate padding function.

Next, the third encryption means 250 performs encryption using a tweakable block cipher on the checksum SUM after conversion, by using the initial vector N that has been output by the initial vector input means 220.

Specifically, the third encryption means 250 adds a mask value that is uniquely determined by a tweak and a secret key to an input or an input and an output of a block cipher for inputting/outputting n-bit data, or an input or an input and an output of non-keyed cryptographic replacement. A tweak is selectively used according to each of the four cases obtained by combining a case where m is an even number or a case where m is an odd number with a case where n'=n or a case where n'≠n.

Next, the third encryption means 250 converts the encrypted checksum SUM into a t-bit value (t<=n), by using an appropriate shortening function, and generates a tag T'. Stated another way, tag generation processing performed by the third encryption means 250 is similar to tag generation processing performed by the second encryption means 150 of the authenticated encryption device 100.

Figure 6:
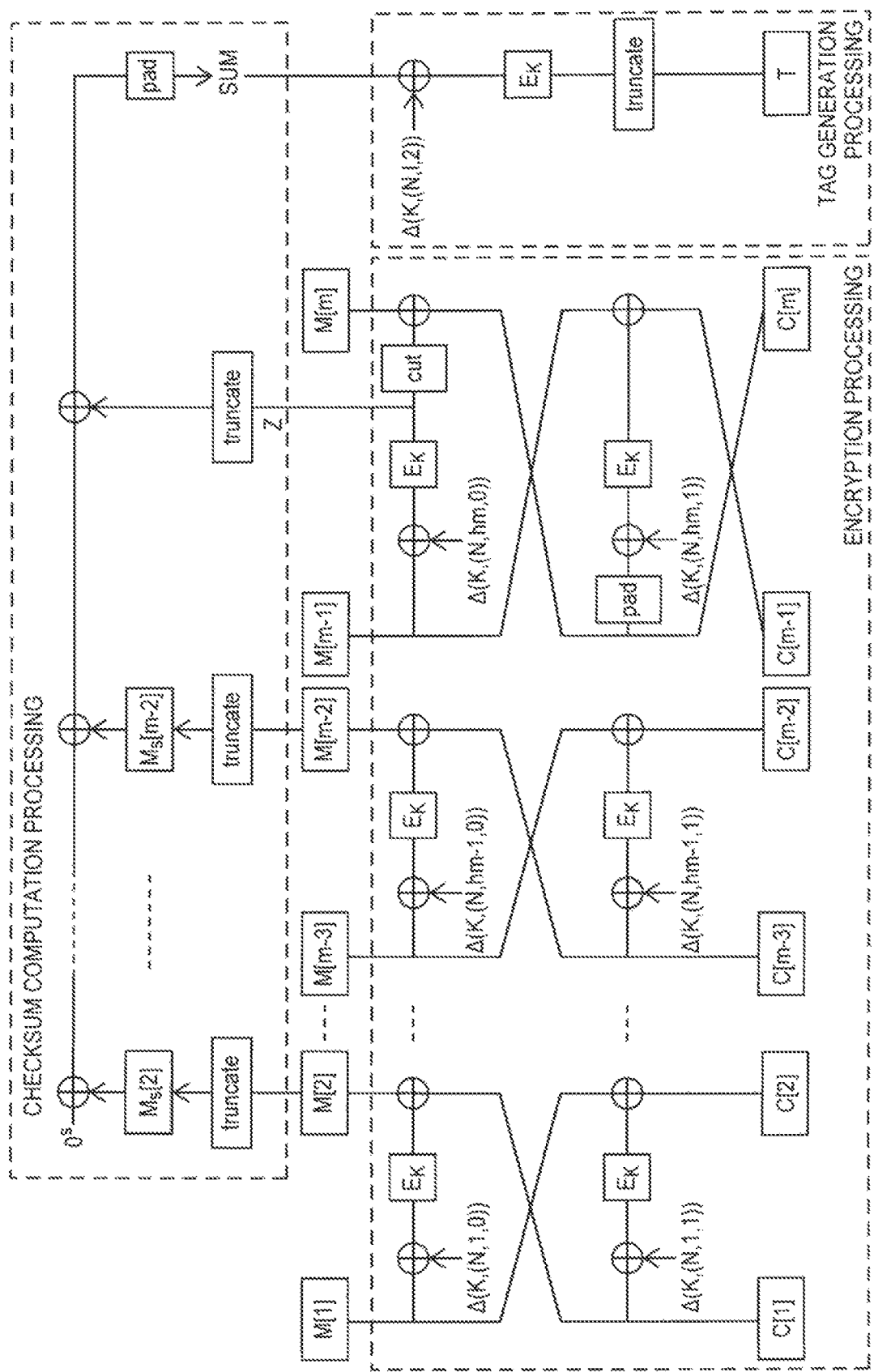
FIG. 6 is an explanatory diagram showing another specific example of the authenticated encryption processing by the authenticated encryption device 100.

FIG. 6 is an explanatory diagram showing another specific example of the authenticated encryption processing by the authenticated encryption device 100.

For example, the first encryption means 130 of the authenticated encryption device 100 performs the encryption processing shown in FIG. 6. Stated another way, the first encryption means 130 performs encryption using a tweakable block cipher TE on (m−1) n-bit plaintext blocks M[1], M[2], . . . , and M[m−1] and an n'-bit plaintext block M[m] (m is an even number, and m/2=hm), where n'<=n, that constitute the plaintext M, by using an initial vector N that has been output by the initial vector generation means 120.

As shown in FIG. 6, the first encryption means 130 encrypts each of the plaintext blocks by using a secret key K and the tweak (N, j, 0) or (N, j, 1) (1<=j<=hm−1). For example, the first encryption means 130 performs computation according to Formulae (22) to (25).

Finally, the first encryption means 130 generates ciphertext C in such a way that C=C[1]C[2] . . . C[m]. Note that decryption processing performed by the decryption means 230 of the authenticated decryption device 200 on ciphertext C that has been output by the ciphertext input means 210 is reverse processing of the encryption processing shown in FIG. 6.

Furthermore, the first computation means 140 of the authenticated encryption device 100 performs the checksum computation processing shown in FIG. 6. Stated another way, the first computation means 140 performs computation in such a way that Z=TE(K, (N, hm, 0), M[m−1]), by using the plaintext M that has been output by the plaintext input means 110 of the authenticated encryption device 100, the initial vector N that has been output by the initial vector generation means 120, and a tweakable block cipher TE.

The first computation means 140 computes an s-bit checksum SUM by adding a partial sequence $M_s[2i]$ of arbitrary s bits, where s<n, of M[2i] (i=1, . . . , hm−1) to a partial sequence of arbitrary s bits of Z that has been computed.

For example, the first computation means 140 performs computation according to Formula (29). Note that checksum computation processing performed by the second computation means 240 of the authenticated decryption device 200 on plaintext M that has been output by the decryption means 230 is also similar to the checksum computation processing shown in FIG. 6.

Furthermore, the second encryption means 150 of the authenticated encryption device 100 performs the tag generation processing shown in FIG. 6. Stated another way, the second encryption means 150 converts the s-bit checksum SUM that has been output by the first computation means 140 of the authenticated encryption device 100 into an n-bit value, by using an appropriate padding function.

Next, the second encryption means 150 performs encryption using a tweakable block cipher on the checksum SUM after conversion, by using the initial vector N that has been output by the initial vector generation means 120.

As shown in FIG. 6, the second encryption means 150 selectively uses a mask value that will be added to an input or an input and an output of a block cipher for inputting/outputting n-bit data, or an input or an input and an output of non-keyed cryptographic replacement and that is uniquely determined by a tweak and a secret key.

Specifically, the second encryption means 150 selectively uses a mask value according to each of the four cases obtained by combining a case where m is an even number or a case where m is an odd number with a case where n'=n or a case where n'≠n. Next, the second encryption means 150 converts the encrypted checksum SUM into a t-bit value (t<=n), by using an appropriate shortening function, and generates a tag T.

Note that tag generation processing performed by the third encryption means 250 of the authenticated decryption device 200 on an s-bit checksum SUM that has been output by the second computation means 240 is similar to the tag generation processing shown in FIG. 6.

Furthermore, the first computation means 140 of the authenticated encryption device 100 in this specific example may compute a checksum as described below, and the second encryption means 150 may generate a tag as described below. A variation of this specific example is described below.

The first computation means 140 computes an n/2-bit checksum SUM by adding a partial sequence $M_{n/2}[2i]$ of arbitrary n/2 bits of M[2i] (i=1, . . . , hm−1) to a partial sequence of arbitrary n/2 bits of Z that has been computed.

Furthermore, the second encryption means 150 of the authenticated encryption device 100 converts the n/2-bit checksum SUM that has been output by the first computation means 140 of the authenticated encryption device 100 into an n-bit value, by using an appropriate padding function.

Next, the second encryption means 150 performs encryption using a tweakable block cipher on the checksum SUM after conversion, by using the initial vector N that has been output by the initial vector generation means 120.

Specifically, the second encryption means 150 adds a mask value that is uniquely determined by a tweak that is selectively used according to a case where m is an even number or a case where m is an odd number, and a secret key, to an input or an input and an output of a block cipher for inputting/outputting n-bit data, or an input or an input and an output of non-keyed cryptographic replacement.

Next, the second encryption means 150 divides Tag_n of n bits that has been obtained in encryption into two n/2-bit pieces Tag1 and Tag2, by using an appropriate division function. Next, the second encryption means 150 generates an n/2-bit tag T in such a way that T=Tag1 when n'=n and T=Tag2 when n'≠n. For example, the tag T is generated as described below.

$$T = \text{Tag1} = (\text{msb}\_(n/2))(\text{Tag\_n}) \ (n' = n) \qquad \text{Formula (34)}$$

$$T = \text{Tag2} = (\text{lsb}\_(n/2))(\text{Tag\_n}) \ (n' \neq n) \qquad \text{Formula (35)}$$

Note that (msb_(n/2))(·) in Formula (34) is a function of outputting a value of higher-order n/2 bits in response to an input. Furthermore, (lsb_(n/2))(·) in Formula (35) is a function of outputting a value of lower-order n/2 bits in response to an input.

As described above, in a case where the second encryption means 150 uses a division function, the number of types of tweaks to be used is reduced from four to two. Stated another way, the number of types of tweaks to be used is halved.

In a case where a length of a tag is n/2 bits, the second encryption means 150 can perform selection according to cases, even after an n-bit result of encrypting a checksum by using a tweakable cipher has been divided into two pieces. Therefore, selection according to four cases is reduced to selection according to two cases. An encrypted n/2-bit value to be used is selected according to cases more efficiently than a tweak to be used.

Note that the second computation means 240 of the authenticated decryption device 200 in this specific example may also compute a checksum on the basis of plaintext M that has been output by the decryption means 230, by performing checksum computation processing that is similar to the checksum computation processing described above performed by the first computation means 140 of the authenticated encryption device 100.

Furthermore, the third encryption means 250 of the authenticated decryption device 200 in this specific example may also generate an n/2-bit tag T' on the basis of a checksum SUM that has been output by the second computation means 240, by performing tag generation processing that is similar to the tag generation processing described above performed by the second encryption means 150 of the authenticated encryption device 100. In the variation described above, the number of types of tweaks to be used is halved.

Description of Effects

Security in a case where n/2<=s<n in the authenticated encryption device 100 and the authenticated decryption device 200 in the second specific example is asymptotically equal to security in a case where s=n, similarly to the first exemplary embodiment and the second exemplary embodiment.

Security in OTR in a case where s=n/2 is described below. In a case where a processing unit is one Feistel structure, a state size in normal OTR is 4n bits. The breakdown of 4n bits is 2n bits for a memory that is used to process plaintext in one Feistel structure, n bits for a memory that holds a mask value, and n bits for a memory that holds a value of a computed checksum.

Furthermore, a state size according to a scheme achieved in the second specific example that has been applied to OTR is 3.5n bits in both encryption and decryption. Stated another way, a state size of 0.5n bits is reduced.

Furthermore, in a case where a processing unit is arbitrary i Feistel structures, a state size in normal OTR is (3i+1)n bits. Furthermore, a state size according to a scheme achieved in the second specific example that has been applied to OTR is (3i+0.5)n bits in both encryption and decryption. Similarly, a state size of 0.5n bits is reduced.

Furthermore, an order of asymptotic security is $O(2^{(n/2)})$ in both a scheme in normal OTR and a scheme achieved in the second specific example that has been applied to OTR. Stated another way, a state size is reduced by 0.5n bits in both encryption processing and decryption processing, without impairing asymptotic security. Therefore, the authenticated encryption device 100 and the authenticated decryption device 200 in the second specific example can simultaneously achieve security and efficiency.

A specific example of a hardware configuration of the authenticated encryption device 100 according to the first exemplary embodiment and a specific example of a hardware configuration of the authenticated decryption device 200 according to the second exemplary embodiment are described below.

Figure 7:
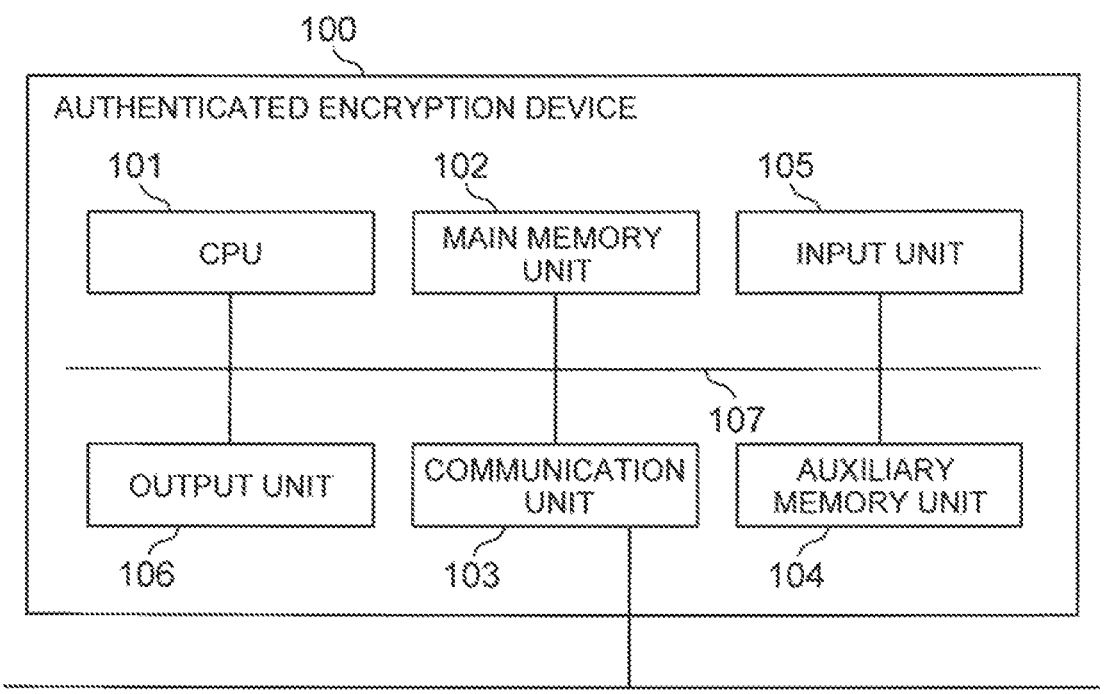
FIG. 7 is an explanatory diagram showing a hardware configuration example of an authenticated encryption device according to the present invention.

FIG. 7 is an explanatory diagram showing a hardware configuration example of an authenticated encryption device 100 according to the present invention. The authenticated encryption device 100 shown in FIG. 7 includes a central processing unit (CPU) 101, a main memory unit 102, a communication unit 103, and an auxiliary memory unit 104. Furthermore, an input unit 105 that is operated by a user or an output unit 106 that presents a processing result or a progress of processing content to a user may be included.

Figure 8:
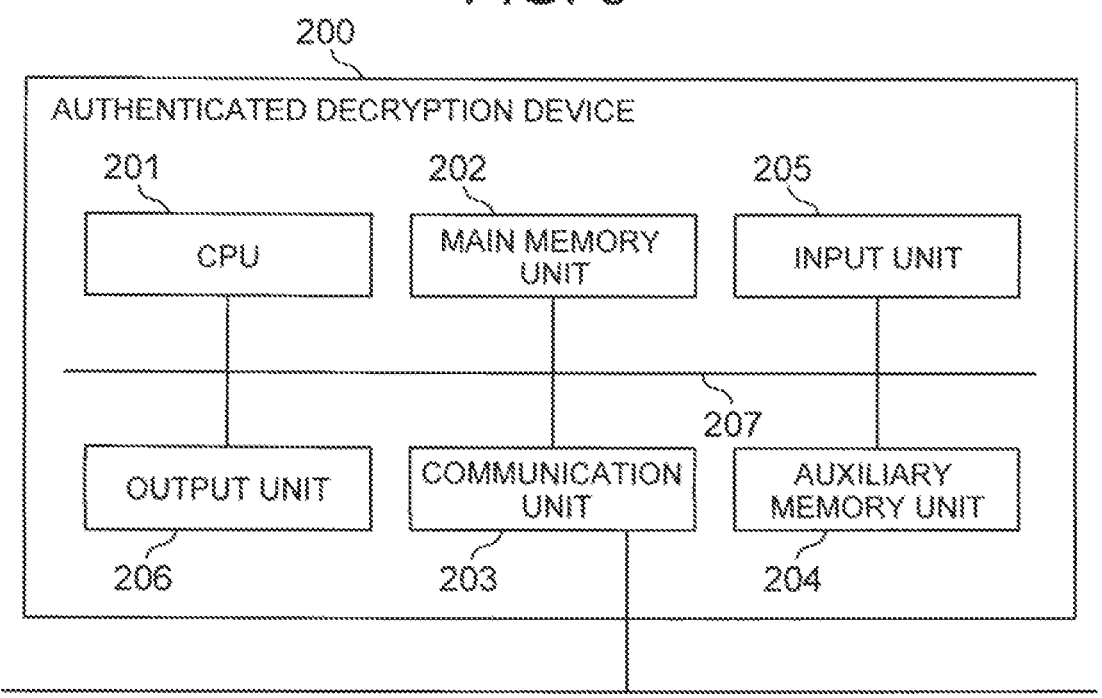
FIG. 8 is an explanatory diagram showing a hardware configuration example of an authenticated decryption device according to the present invention.

FIG. 8 is an explanatory diagram showing a hardware configuration example of an authenticated decryption device 200 according to the present invention. The authenticated decryption device 200 shown in FIG. 8 includes a CPU 201, a main memory unit 202, a communication unit 203, and an auxiliary memory unit 204. Furthermore, an input unit 205 that is operated by a user or an output unit 206 that presents a processing result or a progress of processing content to a user may be included.

The main memory unit 102 and the main memory unit 202 are used as a working area of data or a temporary saving area of data. The main memory unit 102 and the main memory unit 202 are, for example, a random access memory (RAM).

The communication unit 103 and the communication unit 203 have a function of inputting and outputting data to/from a peripheral device via a wired network or a wireless network (an information communication network).

The auxiliary memory unit 104 and the auxiliary memory unit 204 are non-transitory tangible storage media. Examples of a non-transitory tangible storage medium include a magnetic disk, a magneto-optical disk, a compact disk read-only memory (CD-ROM), a digital versatile disk read-only memory (DVD-ROM), and a semiconductor memory.

The input unit 105 and the input unit 205 have a function of inputting data or a processing command. The input unit 105 and the input unit 205 are input devices such as keyboards or mouses. The plaintext input means 110 is implemented, for example, by the input unit 105. Furthermore, the ciphertext input means 210 and the initial vector input means 220 are implemented, for example, by the input unit 205.

The output unit 106 and the output unit 206 have a function of outputting data. The output unit 106 and the output unit 206 are display devices such as liquid crystal display devices, or printing devices such as printers. The ciphertext output means 160 is implemented, for example, by the output unit 106. Furthermore, the plaintext output means 270 is implemented, for example, by the output unit 206.

Furthermore, as shown in FIG. 7, respective components in the authenticated encryption device 100 are connected to a system bus 107. Furthermore, as shown in FIG. 8, respective components in the authenticated decryption device 200 are connected to a system bus 207.

The auxiliary memory unit 104 stores, for example, a program for implementing the initial vector generation means 120, the first encryption means 130, the first computation means 140, and the second encryption means 150 that are shown in FIG. 1.

Note that the authenticated encryption device 100 may be implemented by hardware. For example, the authenticated encryption device 100 may be mounted with a circuit that includes a hardware part, such as a large-scale integration (LSI), into which a program for achieving functions, as shown in FIG. 1, has been incorporated.

Furthermore, the authenticated encryption device 100 may be implemented by software, by the CPU 101 shown in FIG. 7 executing a program for providing functions of respective components shown in FIG. 1.

In a case where the authenticated encryption device 100 is implemented by software, the CPU 101 loads a program stored in the auxiliary memory unit 104 into the main memory unit 102 and executes the program to control an operation of the authenticated encryption device 100. Therefore, respective functions are implemented by software.

The auxiliary memory unit 204 stores, for example, a program for implementing the decryption means 230, the second computation means 240, the third encryption means 250, and the tag inspection means 260 that are shown in FIG. 3.

Note that the authenticated decryption device 200 may be implemented by hardware. For example, the authenticated decryption device 200 may be mounted with a circuit that includes a hardware part, such as an LSI, into which a program for achieving functions, as shown in FIG. 3, has been incorporated.

Furthermore, the authenticated decryption device 200 may be implemented by software, by the CPU 201 shown in FIG. 8 executing a program for providing functions of respective components shown in FIG. 3.

In a case where the authenticated decryption device 200 is implemented by software, the CPU 201 loads a program stored in the auxiliary memory unit 204 into the main memory unit 202 and executes the program to control an operation of the authenticated decryption device 200. Therefore, respective functions are implemented by software.

Furthermore, some or all of respective components may be implemented by general-purpose circuitry or dedicated circuitry, a processor, or the like, or a combination thereof. They may include a single chip, or may include a plurality of chips connected via a bus. Some or all of the respective components may be implemented by a combination of the circuitry described above or the like and a program.

In a case where some or all of the respective components are implemented by a plurality of information processing devices, pieces of circuitry, or the like, the plurality of information processing devices, pieces of circuitry, or the like may be concentratedly disposed or may be distributed and disposed. For example, the information processing devices, the pieces of circuitry, or the like may be implemented in the form of connection to each other via a communication network, such as a client and server system or a cloud computing system.

Figure 9:
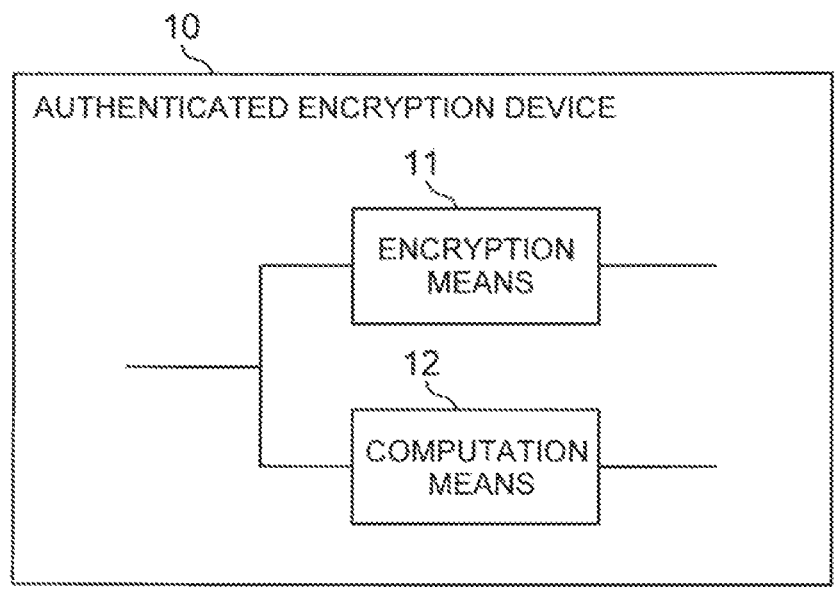
FIG. 9 is a block diagram showing an outline of an authenticated encryption device according to the present invention.

Next, an outline of the present invention is described. FIG. 9 is a block diagram showing an outline of an authenticated encryption device according to the present invention. An authenticated encryption device 10 according to the present invention includes: an encryption means 11 (for example, the first encryption means 130) which encrypts a plaintext block by inputting, to an encryption function (for example, the encryption function of Formula (10)) whereby data of a predetermined bit number is output when data of the predetermined bit number is input, a plaintext block of the predetermined bit number constituting the plaintext to be encrypted with a mask value, which is uniquely determined from an adjustment value (for example, tweak) including an initial vector not overlapping a past value and a secret key, being added; and a computation means 12 (for example, the first computation means 140) which computes, as a checksum, the exclusive OR of corresponding bits of a first bit string, a bit number of which is less than the predetermined bit number, of each of a plurality of plaintext blocks constituting the plaintext.

Such a configuration enables an authenticated encryption device to reduce a state size that increases due to computation of a checksum, without reducing asymptotic security.

Furthermore, the encryption means 11 may encrypt the plaintext block, by adding the mask value to an output of the encryption function.

Such a configuration enables an authenticated encryption device to encrypt a plaintext block by using a tweakable block cipher of the XEX mode.

Furthermore, the authenticated encryption device 10 may include a generation means (for example, the second encryption means 150) which generates an authentication tag, and the generation means may perform: converting the checksum that has been computed into the data of the predetermined bit number; encrypting the checksum that has been converted, by inputting, to the encryption function, the checksum with a mask value, which is uniquely determined from an adjustment value that is different from the adjustment value used by the encryption means 11 and the secret key, being added; and generating the authentication tag, by converting the checksum that has been encrypted into data of a bit number that is less than or equal to the predetermined bit number.

Such a configuration enables an authenticated encryption device to generate an authentication tag on the basis of a checksum for which the bit number is less than a predetermined bit number.

Furthermore, the generation means may encrypt the checksum, by adding the mask value to an output of the encryption function.

Such a configuration enables an authenticated encryption device to encrypt a checksum by using a tweakable block cipher of the XEX mode.

Furthermore, the encryption means 11 may encrypt a final block that constitutes the plaintext and has a bit number that is less than or equal to the predetermined bit number, by adding an output of the encryption function to which is input a fixed value of the predetermined bit number to which the mask value has been added and the final block.

Such a configuration enables an authenticated encryption device to encrypt a final block for which the bit number is less than or equal to a predetermined bit number.

Furthermore, the computation means 12 may perform computing, as the checksum, the exclusive OR of the corresponding bits of the first bit string, the bit number of which is less than the predetermined bit number, of each of a plurality of the plaintext blocks that constitutes the plaintext and is different from the final block. The generation means may perform: converting the final block into the data of the predetermined bit number; and encrypting the checksum that has been converted, by inputting, to the encryption function, the checksum with a mask value, which is uniquely determined from an adjustment value that changes according to whether the bit number of the final block is equal to the predetermined bit number, the secret key, and the final block that has been converted, being added.

Such a configuration enables an authenticated encryption device to prevent an authentication tag from being easily falsified.

Furthermore, the first bit string may have a bit number that is half of the predetermined bit number. The computation means 12 may perform computing, as the checksum, the exclusive OR of the corresponding bits of the first bit string, the bit number of which is less than the predetermined bit number, of each of a plurality of the plaintext blocks that constitutes the plaintext and is different from the final block. The generation means may perform: converting the final block into the data of the predetermined bit number; encrypting the checksum that has been converted, by inputting, to the encryption function, the checksum with a mask value, which is uniquely determined from an adjustment value that is different from the adjustment value used by the encryption means 11, the secret key, and the final block that has been converted, being added; dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

Such a configuration enables an authenticated encryption device to generate an authentication tag without selectively using a tweak.

Furthermore, the encryption means 11 may perform: dividing, from a front, an odd number of the plaintext blocks other than a final block that constitute the plaintext, and have the predetermined bit number and the final block that has a bit number that is less than or equal to the predetermined bit number, and obtaining sets of two blocks; generating an odd-numbered ciphertext block of a corresponding set of the sets that have been obtained, by adding an output of the encryption function to which is input an odd-numbered plaintext block of the corresponding set to which the mask value has been added and an even-numbered plaintext block of the corresponding set; generating an even-numbered ciphertext block of the corresponding set that has been obtained, by adding an output of the encryption function to which is input the odd-numbered ciphertext block to which the mask value has been added and the odd-numbered plaintext block of the corresponding set; generating an even-numbered ciphertext block of a final set of the sets that have been obtained, by adding an output of the encryption function to which is input an odd-numbered plaintext block to which the mask value has been added of the final set and an even-numbered plaintext block of the final set; and generating an odd-numbered ciphertext block of the final set, by adding an output of the encryption function to which is input the even-numbered ciphertext block to which the mask value has been added of the final set and the odd-numbered plaintext block of the final set.

Such a configuration enables an authenticated encryption device to be applied to OTR.

Furthermore, the computation means 12 may perform: computing the output of the encryption function to which is input the odd-numbered plaintext block to which the mask value has been added of the final set of the sets that have been obtained; computing the exclusive OR of the corresponding bits of the first bit string, the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed. The generation means may perform encrypting the checksum that has been converted, by inputting, to the encryption function, the checksum with a mask value, which is uniquely determined from an adjustment value that changes according to whether the bit number of the final block is equal to the predetermined bit number and the secret key, being added.

Such a configuration enables an authenticated encryption device to be applied to OTR.

Furthermore, the first bit string may have a bit number that is half of the predetermined bit number. The computation means 12 may perform: computing the output of the encryption function to which is input the odd-numbered plaintext block to which the mask value has been added of the final set of the sets that have been obtained; computing the exclusive OR of the corresponding bits of the first bit string, the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed. The generation means may perform: dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

Such a configuration enables an authenticated encryption device to generate an authentication tag without selectively using a tweak.

Furthermore, the authenticated encryption device 10 may include a ciphertext output means (for example, the ciphertext output means 160) which outputs both the ciphertext that has been generated by the encryption means 11 and the authentication tag. Furthermore, the authenticated encryption device 10 may include a plaintext input means (for example, the plaintext input means 110) to which the plaintext to be encrypted is input. Furthermore, the authenticated encryption device 10 may include an initial vector generation means (for example, the initial vector generation means 120) which generates the initial vector.

Figure 10:
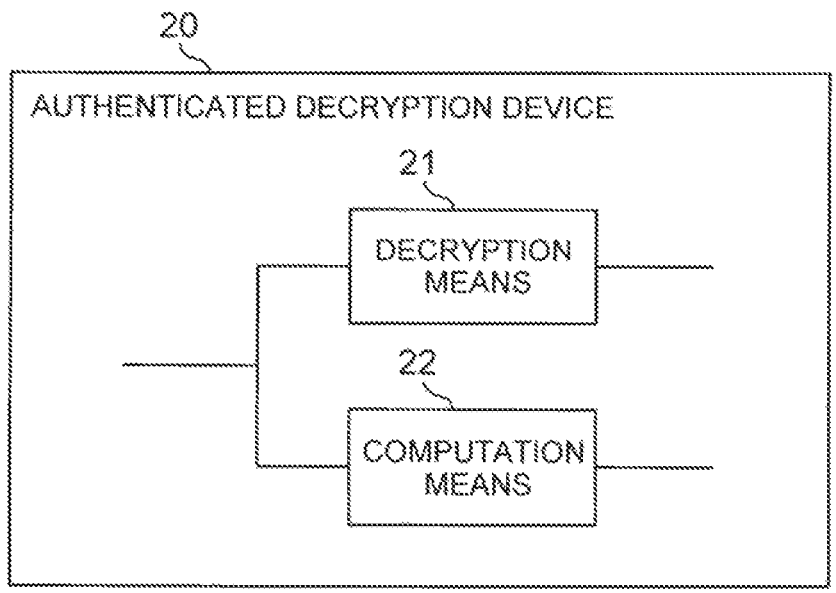
FIG. 10 is a block diagram showing an outline of an authenticated decryption device according to the present invention.

Furthermore, FIG. 10 is a block diagram showing an outline of an authenticated decryption device according to the present invention. An authenticated decryption device 20 according to the present invention includes: a decryption means 21 (for example, the decryption means 230) which decrypts a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and a computation means 22 (for example, the second computation means 240) which computes, as a checksum, the exclusive OR of corresponding bits of a first bit string, a bit number of which is less than the predetermined bit number, of each of a plurality of plaintext blocks constituting a plaintext obtained by decrypting the ciphertext.

Such a configuration enables an authenticated decryption device to reduce a state size that increases due to computation of a checksum, without reducing asymptotic security.

Furthermore, the decryption means 21 may decrypt the ciphertext block, by adding the mask value to an output of the decryption function.

Such a configuration enables an authenticated decryption device to decrypt a ciphertext block by using a tweakable block cipher of the XEX mode.

Furthermore, the authenticated decryption device 20 may include a generation means (for example, the third encryption means 250) which generates an authentication tag. The generation means may perform: converting the checksum that has been computed into the data of the predetermined bit number; encrypting the checksum that has been converted, by inputting, to an encryption function whereby data of the predetermined bit number is output when data of the predetermined bit number is input, the checksum with a mask value, which is uniquely determined from an adjustment value that is different from the adjustment value used by the decryption means 21 and the secret key, being added; and generating the authentication tag, by converting the checksum that has been encrypted into data of a bit number that is less than or equal to the predetermined bit number.

Such a configuration enables an authenticated decryption device to generate an authentication tag on the basis of a checksum for which the bit number is less than a predetermined bit number.

Furthermore, the generation means may encrypt the checksum, by adding the mask value to an output of the encryption function.

Such a configuration enables an authenticated decryption device to encrypt a checksum by using a tweakable block cipher of the XEX mode.

Furthermore, the authenticated decryption device 20 may include an output means (for example, the tag inspection means 260 and the plaintext output means 270) which outputs a verification result of decryption processing. The output means may perform: outputting the verification result indicating acknowledgement, when the authentication tag that matches the authentication tag that has been input together with the ciphertext is generated; and outputting the verification result indicating non-acknowledgement, when the authentication tag that does not match the authentication tag that has been input is generated.

Such a configuration enables an authenticated decryption device to present a result of verifying decryption processing.

Furthermore, the output means may perform: outputting the plaintext obtained by decrypting the ciphertext, together with the verification result indicating the acknowledgement; and outputting an error message together with the verification result indicating the non-acknowledgement.

Such a configuration enables an authenticated decryption device to present plaintext or an error message in accordance with a result of verifying decryption processing.

Furthermore, the authenticated decryption device 20 may include a ciphertext input means (for example, the ciphertext input means 210) to which the ciphertext to be decrypted and the authentication tag are input. Furthermore, the authenticated decryption device 20 may include an initial vector input means (for example, the initial vector input means 220) to which the initial vector is input.

The invention of the present application has been described above with reference to the exemplary embodiments and the examples, but the invention of the present application is not limited to the exemplary embodiments and the examples that have been described above. Various changes that those skilled in the art could understand without departing from the scope of the invention of the present application can be made to a configuration or details of the invention of the present application.

Furthermore, part or all of the exemplary embodiments described above can also be described as described in the following supplementary notes, but the invention of the present application is not limited to the following.

(Supplementary note 1) An authenticated encryption device including: an encryption means which encrypts a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector not overlapping a past value and a secret key, being added; and a computation means which computes, as a checksum, the exclusive OR of corresponding bits of a first bit string, a bit number of which is less than the predetermined bit number, of each of a plurality of plaintext blocks constituting the plaintext.

(Supplementary note 2) The authenticated encryption device according to supplementary note 1, in which the encryption means encrypts the plaintext block, by adding the mask value to an output of the encryption function.

(Supplementary note 3) The authenticated encryption device according to supplementary note 1 or 2, including: a generation means which generates an authentication tag, in which the generation means performs: converting the checksum that has been computed into the data of the predetermined bit number; encrypting the checksum that has been converted, by inputting, to the encryption function, the checksum with a mask value, which is uniquely determined from an adjustment value that is different from the adjustment value used by the encryption means and the secret key, being added; and generating the authentication tag, by converting the checksum that has been encrypted into data of a bit number that is less than or equal to the predetermined bit number.

(Supplementary note 4) The authenticated encryption device according to supplementary note 3, in which the generation means encrypts the checksum, by adding the mask value to an output of the encryption function.

(Supplementary note 5) The authenticated encryption device according to supplementary note 3 or 4, in which the encryption means encrypts a final block that constitutes the plaintext and has a bit number that is less than or equal to the predetermined bit number, by adding an output of the encryption function to which is input a fixed value of the predetermined bit number to which the mask value has been added and the final block.

(Supplementary note 6) The authenticated encryption device according to supplementary note 5, in which the computation means performs: computing, as the checksum, the exclusive OR of the corresponding bits of the first bit string, the bit number of which is less than the predetermined bit number, of each of a plurality of the plaintext blocks that constitutes the plaintext and is different from the final block, and the generation means performs: converting the final block into the data of the predetermined bit number; and encrypting the checksum that has been converted, by inputting, to the encryption function, the checksum with a mask value, which is uniquely determined from an adjustment value that changes according to whether the bit number of the final block is equal to the predetermined bit number, the secret key, and the final block that has been converted, being added.

(Supplementary note 7) The authenticated encryption device according to supplementary note 5, in which the first bit string has a bit number that is half of the predetermined bit number, the computation means performs: computing, as the checksum, the exclusive OR of the corresponding bits of the first bit string, the bit number of which is less than the predetermined bit number, of each of a plurality of the plaintext blocks that constitutes the plaintext and is different from the final block, and the generation means performs: converting the final block into the data of the predetermined bit number; encrypting the checksum that has been converted, by inputting, to the encryption function, the checksum with a mask value, which is uniquely determined from an adjustment value that is different from the adjustment value used by the encryption means, the secret key, and the final block that has been converted, being added; dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

(Supplementary note 8) The authenticated encryption device according to supplementary note 3 or 4, in which the encryption means performs: dividing, from a front, an odd number of the plaintext blocks other than a final block that constitute the plaintext, and have the predetermined bit number and the final block that has a bit number that is less than or equal to the predetermined bit number, and obtaining sets of two blocks; generating an odd-numbered ciphertext block of a corresponding set of the sets that have been obtained, by adding an output of the encryption function to which is input an odd-numbered plaintext block of the corresponding set to which the mask value has been added and an even-numbered plaintext block of the corresponding set; generating an even-numbered ciphertext block of the corresponding set that has been obtained, by adding an output of the encryption function to which is input the odd-numbered ciphertext block to which the mask value has been added and the odd-numbered plaintext block of the corresponding set; generating an even-numbered ciphertext block of a final set of the sets that have been obtained, by adding an output of the encryption function to which is input an odd-numbered plaintext block to which the mask value has been added of the final set and an even-numbered plaintext block of the final set; and generating an odd-numbered ciphertext block of the final set, by adding an output of the encryption function to which is input the even-numbered ciphertext block to which the mask value has been added of the final set and the odd-numbered plaintext block of the final set.

(Supplementary note 9) The authenticated encryption device according to supplementary note 8, in which the computation means performs: computing the output of the encryption function to which is input the odd-numbered plaintext block to which the mask value has been added of the final set of the sets that have been obtained; computing the exclusive OR of the corresponding bits of the first bit string, the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed, and the generation means performs: encrypting the checksum that has been converted, by inputting, to the encryption function, the checksum with a mask value, which is uniquely determined from an adjustment value that changes according to whether the bit number of the final block is equal to the predetermined bit number and the secret key, being added.

(Supplementary note 10) The authenticated encryption device according to supplementary note 8, in which the first bit string has a bit number that is half of the predetermined bit number, the computation means performs: computing the output of the encryption function to which is input the odd-numbered plaintext block to which the mask value has been added of the final set of the sets that have been obtained; computing the exclusive OR of the corresponding bits of the first bit string, the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed, and the generation means performs: dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

(Supplementary note 11) An authenticated decryption device including: a decryption means which decrypts a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and a computation means which computes, as a checksum, the exclusive OR of corresponding bits of a first bit string, a bit number of which is less than the predetermined bit number, of each of a plurality of plaintext blocks constituting a plaintext obtained by decrypting the ciphertext.

(Supplementary note 12) The authenticated decryption device according to supplementary note 11, in which the decryption means decrypts the ciphertext block, by adding the mask value to an output of the decryption function.

(Supplementary note 13) The authenticated decryption device according to supplementary note 11 or 12, including: a generation means which generates an authentication tag, in which the generation means performs: converting the checksum that has been computed into the data of the predetermined bit number; encrypting the checksum that has been converted, by inputting, to an encryption function whereby data of the predetermined bit number is output when data of the predetermined bit number is input, the checksum with a mask value, which is uniquely determined from an adjustment value that is different from the adjustment value used by the decryption means and the secret key, being added; and generating the authentication tag, by converting the checksum that has been encrypted into data of a bit number that is less than or equal to the predetermined bit number.

(Supplementary note 14) The authenticated decryption device according to supplementary note 13, in which the generation means encrypts the checksum, by adding the mask value to an output of the encryption function.

(Supplementary note 15) The authenticated decryption device according to supplementary note 13 or 14, in which the decryption means decrypts a final block that constitutes the ciphertext and has a bit number that is less than or equal to the predetermined bit number, by adding an output of the encryption function to which is input a fixed value of the predetermined bit number to which the mask value has been added and the final block.

(Supplementary note 16) The authenticated decryption device according to supplementary note 15, in which the computation means performs: computing, as the checksum, the exclusive OR of the corresponding bits of the first bit string, the bit number of which is less than the predetermined bit number, of each of a plurality of the plaintext blocks that constitutes the plaintext and is different from the final block, and the generation means performs: converting the final block into the data of the predetermined bit number; and encrypting the checksum that has been converted, by inputting, to the encryption function, the checksum with a mask value, which is uniquely determined from an adjustment value that changes according to whether the bit number of the final block is equal to the predetermined bit number, the secret key, and the final block that has been converted, being added.

(Supplementary note 17) The authenticated decryption device according to supplementary note 15, in which the first bit string has a bit number that is half of the predetermined bit number, the computation means performs: computing, as the checksum, the exclusive OR of the corresponding bits of the first bit string, the bit number of which is less than the predetermined bit number, of each of a plurality of the plaintext blocks that constitutes the plaintext and is different from the final block, and the generation means performs: converting the final block into the data of the predetermined bit number; encrypting the checksum that has been converted, by inputting, to the encryption function, the checksum with a mask value, which is uniquely determined from an adjustment value that is different from the adjustment value used by the encryption means, the secret key, and the final block that has been converted, being added; dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

(Supplementary note 18) The authenticated decryption device according to supplementary note 13 or 14, in which the decryption means performs: dividing, from a front, an odd number of the ciphertext blocks other than a final block that constitute the ciphertext, and have the predetermined bit number and the final block that has a bit number that is less than or equal to the predetermined bit number, and obtaining sets of two blocks; generating an odd-numbered plaintext block of a corresponding set of the sets that have been obtained, by adding an output of the encryption function to which is input an odd-numbered ciphertext block of the corresponding set to which the mask value has been added and an even-numbered ciphertext block of the corresponding set; generating an even-numbered plaintext block of the corresponding set that has been obtained, by adding an output of the encryption function to which is input the odd-numbered plaintext block to which the mask value has been added and the odd-numbered ciphertext block of the corresponding set; generating an odd-numbered plaintext block of a final set of the sets that have been obtained, by adding an output of the encryption function to which is input an even-numbered ciphertext block to which the mask value has been added of the final set and an odd-numbered ciphertext block of the final set; and generating an even-numbered plaintext block of the final set, by adding an output of the encryption function to which is input the odd-numbered plaintext block to which the mask value has been added of the final set and the even-numbered ciphertext block of the final set.

(Supplementary note 19) The authenticated decryption device according to supplementary note 18, in which the computation means performs: dividing, from a front, an odd number of the plaintext blocks other than a final block that constitute the plaintext, and have the predetermined bit number and the final block that has a bit number that is less than or equal to the predetermined bit number, and obtaining sets of two blocks; computing the output of the encryption function to which is input the odd-numbered plaintext block to which the mask value has been added of the final set of the sets that have been obtained; computing the exclusive OR of the corresponding bits of the first bit string the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed, and the generation means performs: encrypting the checksum that has been converted, by inputting, to the encryption function, the checksum with a mask value, which is uniquely determined from an adjustment value that changes according to whether the bit number of the final block is equal to the predetermined bit number and the secret key, being added.

(Supplementary note 20) The authenticated decryption device according to supplementary note 18, in which the first bit string has a bit number that is half of the predetermined bit number, the computation means performs: dividing, from a front, an odd number of the plaintext blocks other than a final block that constitute the plaintext, and have the predetermined bit number and the final block that has a bit number that is less than or equal to the predetermined bit number, and obtaining sets of two blocks; computing the output of the encryption function to which is input the odd-numbered plaintext block to which the mask value has been added of the final set of the sets that have been obtained; computing the exclusive OR of the corresponding bits of the first bit string the bit number of which is less than the predetermined bit number, of each of even-numbered plaintext blocks that constitute the plaintext and are different from the final block; and computing the checksum, by computing a bitwise exclusive OR of the exclusive OR that has been computed and the output that has been computed, and the generation means performs: dividing the checksum that has been encrypted into two pieces of data of the bit number of the first bit string; and outputting, as the authentication tag, any of the two pieces of data obtained by the dividing in accordance with whether the bit number of the final block is equal to the predetermined bit number.

(Supplementary note 21) The authenticated decryption device according to any of supplementary notes 13 to 20, including: an output means which outputs a verification result of decryption processing, in which the output means performs: outputting the verification result indicating acknowledgement, when the authentication tag that matches the authentication tag that has been input together with the ciphertext is generated; and outputting the verification result indicating non-acknowledgement, when the authentication tag that does not match the authentication tag that has been input is generated.

(Supplementary note 22) The authenticated decryption device according to supplementary note 21, in which the output means performs: outputting the plaintext obtained by decrypting the ciphertext, together with the verification result indicating the acknowledgement; and outputting an error message together with the verification result indicating the non-acknowledgement.

(Supplementary note 23) An authenticated encryption method including: encrypting a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector not overlapping a past value and a secret key, being added; and computing, as a checksum, the exclusive OR of corresponding bits of a first bit string, a bit number of which is less than the predetermined bit number, of each of a plurality of plaintext blocks constituting the plaintext.

(Supplementary note 24) An authenticated decryption method including: decrypting a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and computing, as a checksum, the exclusive OR of corresponding bits of a first bit string, a bit number of which is less than the predetermined bit number, of each of a plurality of plaintext blocks constituting a plaintext obtained by decrypting the ciphertext.

(Supplementary note 25) An authenticated encryption program that causes a computer to perform processing including: encryption processing for encrypting a plaintext block by inputting, to an encryption function whereby data of a predetermined bit number is output when data of the predetermined bit number is input, a plaintext block of the predetermined bit number constituting the plaintext to be encrypted with a mask value which is uniquely determined from an adjustment value including an initial vector not overlapping a past value and a secret key, being added; and computation processing for computing, as a checksum, the exclusive OR of corresponding bits of a first bit string, a bit number of which is less than the predetermined bit number, of each of a plurality of plaintext blocks constituting the plaintext.

(Supplementary note 26) An authenticated decryption program that causes a computer to perform processing including: decryption processing for decrypting a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector not overlapping a past value and a secret key, being added; and computation processing for computing, as a checksum, the exclusive OR of corresponding bits of a first bit string, a bit number of which is less than the predetermined bit number, of each of a plurality of plaintext blocks constituting a plaintext obtained by decrypting the ciphertext.

INDUSTRIAL APPLICABILITY

The present invention is preferably applied to encryption and message authentication in wireless or wired data communication, or protection of communication between a wireless sensor device and an information collection server.

REFERENCE SIGNS LIST 10, 100 Authenticated encryption device
11 Encryption means
12, 22 Computation means
101, 201 CPU
102, 202 Main memory unit
103, 203 Communication unit
104, 204 Auxiliary memory unit
105, 205 Input unit
106, 206 Output unit
107, 207 System bus
110 Plaintext input means
120 Initial vector generation means
130 First encryption means
140 First computation means
150 Second encryption means
160 Ciphertext output means
20, 200 Authenticated decryption device
21, 230 Decryption means
210 Ciphertext input means
220 Initial vector input means
240 Second computation means
250 Third encryption means
260 Tag inspection means
270 Plaintext output means

What is claimed is:

1. An authenticated encryption device comprising:
a memory configured to store instructions; and
a processor configured to execute the instructions to:
encrypt a plaintext block by inputting, to an encryption function whereby data of a predetermined bit number is output when data of the predetermined bit number is input, a plaintext block of the predetermined bit number constituting the plaintext to be encrypted with a mask value, which is uniquely determined from an adjustment value including an initial vector having a value that is different from a value of an initial vector generated in the past, and a secret key; and
compute, as a checksum, the exclusive OR of corresponding bits of a first bit string, a bit number of which is less than the predetermined bit number, of each of a plurality of plaintext blocks constituting the plaintext.

2. The authenticated encryption device according to claim 1, wherein the processor is further configured to execute the instructions to:
encrypt the plaintext block, by adding the mask value to an output of the encryption function.

3. The authenticated encryption device according to claim 1, wherein the processor is further configured to execute the instructions to:
generate an authentication tag;
convert the checksum that has been computed into the data of the predetermined bit number;
encrypt the checksum that has been converted, by inputting, to the encryption function, the checksum with a second mask value, which is uniquely determined from a second adjustment value that is different from the adjustment value used by the processor to encrypt using the secret key; and
generate the authentication tag, by converting the checksum that has been encrypted into data of a bit number that is less than or equal to the predetermined bit number.

4. The authenticated encryption device according to claim 3, wherein the processor is further configured to execute the instructions to:
encrypt the checksum, by adding the second mask value to an output of the encryption function.

5. The authenticated encryption device according to claim 3, wherein the processor is further configured to execute the instructions to:
encrypt a final block that constitutes the plaintext and has a bit number that is less than or equal to the predetermined bit number, by adding an output of the encryption function to which is input a fixed value of the predetermined bit number to which a third mask value has been added and the final block.

6. The authenticated encryption device according to claim 5, wherein the processor is further configured to execute the instructions to:
compute, as a second checksum, the exclusive OR of the corresponding bits of the first bit string, the bit number of which is less than the predetermined bit number, of each of a plurality of the plaintext blocks that constitutes the plaintext and is different from the final block;
convert the final block into the data of the predetermined bit number; and
encrypt the second checksum that has been converted, by inputting, to the encryption function, the second checksum with a fourth mask value, which is uniquely determined from a third adjustment value that changes according to whether the bit number of the final block is equal to the predetermined bit number, the secret key, and the final block that has been converted.

7. The authenticated encryption device according to claim 5, wherein
the first bit string has a bit number that is half of the predetermined bit number, and
the processor is further configured to execute the instructions to:
compute, as a third checksum, the exclusive OR of the corresponding bits of the first bit string, the bit number of which is less than the predetermined bit number, of each of a plurality of the plaintext blocks that constitutes the plaintext and is different from the final block;
convert the final block into the data of the predetermined bit number;
encrypt the third checksum that has been converted, by inputting, to the encryption function, the third checksum with a fifth mask value, which is uniquely determined from a second adjustment value that is different from the adjustment value, the secret key, and the final block that has been converted;
divide the third checksum that has been encrypted into two pieces of data of the bit number of the first bit string; and
output, as the authentication tag, any of the two pieces of data obtained by the dividing in accordance with whether the bit number of the final block is equal to the predetermined bit number.

8. The authenticated encryption device according to claim 3, wherein the processor is further configured to execute the instructions to:
divide, from a front of the plaintext, the odd plaintext blocks other than a final block that constitute the plaintext, and have the predetermined bit number and the final block that has a bit number that is less than or equal to the predetermined bit number, and obtaining sets of two blocks;
generate an odd-numbered ciphertext block of a corresponding set of the sets that have been obtained, by adding an output of the encryption function to which is input an odd-numbered plaintext block of the corresponding set to which a sixth mask value has been added and an even-numbered plaintext block of the corresponding set;
generate an even-numbered ciphertext block of the corresponding set that has been obtained, by adding an output of the encryption function to which is input the odd-numbered ciphertext block to which the sixth mask value has been added and the odd-numbered plaintext block of the corresponding set;
generate an even-numbered ciphertext block of a final set of the sets that have been obtained, by adding an output of the encryption function to which is input an odd-numbered plaintext block to which a seventh mask value has been added of the final set and an even-numbered plaintext block of the final set; and
generate an odd-numbered ciphertext block of the final set, by adding an output of the encryption function to which is input the even-numbered ciphertext block to which the seventh mask value has been added of the final set and the odd-numbered plaintext block of the final set.

9. The authenticated encryption device according to claim 8, wherein the processor is further configured to execute the instructions to:

compute the output of the encryption function to which is input the odd-numbered plaintext block to which the seventh mask value has been added of the final set of the sets that have been obtained;
compute the exclusive OR of the corresponding bits of the first bit string, the bit number of which is less than the predetermined bit number, of each of even-numbered plaintext blocks that constitute the plaintext and are different from the final block;
compute a fourth checksum, by computing a bitwise exclusive OR of the exclusive OR that has been computed and the output that has been computed; and
encrypt the checksum that has been converted, by inputting, to the encryption function, the checksum with an eighth mask value, which is uniquely determined from the third adjustment value that changes according to whether the bit number of the final block is equal to the predetermined bit number and the secret key.

10. The authenticated encryption device according to claim 8, wherein
the first bit string has a bit number that is half of the predetermined bit number, and
the processor is further configured to execute the instructions to:
compute the output of the encryption function to which is input the odd-numbered plaintext block to which the seventh mask value has been added of the final set of the sets that have been obtained;
compute the exclusive OR of the corresponding bits of the first bit string, the bit number of which is less than the predetermined bit number, of each of even-numbered plaintext blocks that constitute the plaintext and are different from the final block;
compute a fifth checksum, by computing a bitwise exclusive OR of the exclusive OR that has been computed and the output that has been computed,
divide the checksum that has been encrypted into two pieces of data of the bit number of the first bit string; and
output, as the authentication tag, any of the two pieces of data obtained by the dividing in accordance with whether the bit number of the final block is equal to the predetermined bit number.

11. The authenticated encryption device according to claim 2, wherein the processor is further configured to execute the instructions to:
generate an authentication tag
convert the checksum that has been computed into the data of the predetermined bit number;
encrypt the checksum that has been converted, by inputting, to the encryption function, the checksum with a second mask value, which is uniquely determined from a second adjustment value that is different from the adjustment value, and the secret key; and
generate the authentication tag, by converting the checksum that has been encrypted into data of a bit number that is less than or equal to the predetermined bit number.

12. The authenticated encryption device according to claim 11, wherein the processor is further configured to execute the instructions to:
encrypt the checksum, by adding the second mask value to an output of the encryption function.

13. An authenticated decryption device comprising:
a memory configured to store instructions; and
a processor configured to execute the instructions to:
  decrypt a ciphertext block by inputting, to a decryption function whereby data of a predetermined bit number is output when data of the predetermined bit number is input, a ciphertext block of the predetermined bit number constituting the ciphertext to be decrypted with a mask value, which is uniquely determined from an adjustment value including an initial vector having a value that is different from a value of an initial vector generated in the past, and a secret key; and
  compute, as a checksum, the exclusive OR of corresponding bits of a first bit string, a bit number of which is less than the predetermined bit number, of each of a plurality of plaintext blocks constituting a plaintext obtained by decrypting the ciphertext.

14. The authenticated decryption device according to claim 13, wherein the processor is further configured to execute the instructions to:
  decrypt the ciphertext block, by adding the mask value to an output of the decryption function.

15. The authenticated decryption device according to claim 14, wherein the processor is further configured to execute the instructions to:
  generate an authentication tag;
  convert the checksum that has been computed into the data of the predetermined bit number;
  encrypt the checksum that has been converted, by inputting, to an encryption function whereby data of the predetermined bit number is output when data of the predetermined bit number is input, the checksum with a second mask value, which is uniquely determined from a second adjustment value that is different from the adjustment value, and the secret key; and
  generate the authentication tag, by converting the checksum that has been encrypted into data of a bit number that is less than or equal to the predetermined bit number.

16. The authenticated decryption device according to claim 15, wherein the processor is further configured to execute the instructions to:
  encrypt the checksum, by adding the second mask value to an output of the encryption function.

17. The authenticated decryption device according to claim 13, wherein the processor is further configured to execute the instructions to:
  generate an authentication tag,
  convert the checksum that has been computed into the data of the predetermined bit number;
  encrypt the checksum that has been converted, by inputting, to an encryption function whereby data of the predetermined bit number is output when data of the predetermined bit number is input, the checksum with a second mask value, which is uniquely determined from a second adjustment value that is different from the adjustment value, and the secret key; and
  generate the authentication tag, by converting the checksum that has been encrypted into data of a bit number that is less than or equal to the predetermined bit number.

18. The authenticated decryption device according to claim 17, wherein the processor is further configured to execute the instructions to:
  encrypt the checksum, by adding the second mask value to an output of the encryption function.

19. The authenticated decryption device according to claim 17, wherein the processor is further configured to execute the instructions to:
  output a verification result of decryption processing;
  output the verification result indicating acknowledgement, when the authentication tag that matches the authentication tag that has been input together with the ciphertext is generated; and
  output the verification result indicating non-acknowledgement, when the authentication tag that does not match the authentication tag that has been input is generated.

20. The authenticated decryption device according to claim 19, wherein the processor is further configured to execute the instructions to:
  output the plaintext obtained by decrypting the ciphertext, together with the verification result indicating the acknowledgement; and
  output an error message together with the verification result indicating the non-acknowledgement.

* * * * *